(12) United States Patent
Kawai et al.

(10) Patent No.: US 7,350,917 B2
(45) Date of Patent: Apr. 1, 2008

(54) LIGHT CONTROL PLASTIC LENS, COATED SHEET-LIKE LIGHT CONTROL ELEMENT FOR THE LENS PRODUCTION, AND A PRODUCTION METHOD FOR LIGHT CONTROL PLASTIC LENS

(76) Inventors: Ryozo Kawai, c/o Fuji Kasei Co., Ltd., 4-2242, Mikajima, Tokorozawa City, Saitama (JP) 359-1164; Yoshiyuki Aoki, c/o Fuji Kasei Co., Ltd., 4-2242, Mikajima, Tokorozawa City, Saitama (JP) 359-1164; Kyohei Takakuwa, c/o Fuji Kasei Co., Ltd., 4-2242, Mikajima, Tokorozawa City, Saitama (JP) 359-1164; Mitsuhiko Masumoto, c/o Mitsubishi Gas Chemical Company, Inc., 5-2, Marunouchi 2-chome, Chiyoda-ku, Tokyo (JP) 100-8324; Toshizumi Hirota, c/o Mitsubishi Gas Chemical Company, Inc., Osaka Plant, 2-12, Kamisucho, Toyonaka, Osaka (JP) 561-0823; Motoharu Takeuchi, c/o Mitsubishi Gas Chemical Company, Inc., Tokyo Research Lab., 1-1, Niijuku 6-chome, Katsushika-ku, Tokyo (JP) 125-0051

( * ) Notice: Subject to any disclaimer, the term of this patent is extended or adjusted under 35 U.S.C. 154(b) by 193 days.

(21) Appl. No.: 11/041,337

(22) Filed: Jan. 25, 2005

(65) Prior Publication Data

US 2005/0168690 A1    Aug. 4, 2005

(30) Foreign Application Priority Data

| Feb. 2, 2004 | (JP) | ............................. 2004-025896 |
| Mar. 30, 2004 | (JP) | ............................. 2004-098840 |
| Apr. 21, 2004 | (JP) | ............................. 2004-126003 |

(51) Int. Cl.
  *G02C 7/10*    (2006.01)
(52) U.S. Cl. ...................................... 351/163; 351/166
(58) Field of Classification Search ........ 351/163–166, 351/177
  See application file for complete search history.

(56) References Cited

U.S. PATENT DOCUMENTS

| 3,833,289 A | 9/1974 | Schuler |
| 4,230,768 A | 10/1980 | Hamada et al. |
| 4,268,134 A * | 5/1981 | Gulati et al. ................. 351/163 |
| 4,793,703 A * | 12/1988 | Fretz, Jr. ....................... 351/163 |

(Continued)

FOREIGN PATENT DOCUMENTS

| JP | 61-236521 | 10/1986 |

(Continued)

*Primary Examiner*—Scott J. Sugarman
(74) *Attorney, Agent, or Firm*—Sughrue Mion, PLLC

(57) ABSTRACT

A light control plastic lens, a sheet-like light control element, and a production method for light control plastic lenses are provided. More specifically, a light control plastic lens, such as a high index polarizing property and/or a photochromic plastic lens that is made by cast polymerization is provided. Also provided is a sheet-like light control element for use in the production of the lenses, as well as a production method of such light control plastic lenses. The light control plastic lens has a sheet-like light control element including at least a light control sheet. In particular, the light control plastic lens has a sheet-like light control element, a curable resin layer laminated on at least one surface of the sheet-like light control element, and a polymerizable lens resin layer laminated at least on the curable resin layer.

14 Claims, 1 Drawing Sheet

U.S. PATENT DOCUMENTS

| | | |
|---|---|---|
| 5,130,353 A | 7/1992 | Fischer et al. |
| 7,048,997 B2 * | 5/2006 | Bhalakia et al. ............ 428/339 |

FOREIGN PATENT DOCUMENTS

| | | |
|---|---|---|
| JP | 63-178193 | 7/1988 |
| JP | 1-232006 | 9/1989 |
| JP | 7-94154 | 10/1995 |
| JP | 7-253633 | 10/1995 |
| JP | 8-52817 | 2/1996 |
| JP | 2002-62423 | 2/2002 |
| WO | WO 01/77740 A1 | 10/2001 |
| WO | WO 02/099513 A1 | 12/2002 |

* cited by examiner

LIGHT CONTROL PLASTIC LENS, COATED SHEET-LIKE LIGHT CONTROL ELEMENT FOR THE LENS PRODUCTION, AND A PRODUCTION METHOD FOR LIGHT CONTROL PLASTIC LENS

TECHNICAL FIELD

The present invention relates to light control plastic lenses, sheet-like light control elements, and production methods for light control plastic lenses. More specifically, the present invention relates to light control plastic lenses, such as high index plastic lenses that are made by cast polymerization and have a polarizing property and/or a photochromic property. The present invention also relates to sheet-like light control elements for use in the production of the lenses, as well as a production method of such light control plastic lenses.

BACKGROUND ART

In recent years, plastic lenses have become increasingly used as eyeglass lenses because of their lightweight and unbreakability and, thus, high safety over glass lenses. Consequently, plastic lenses are now required to have the same additional functions as those previously imparted to glass lenses. One of such functions is the polarizing property that allows the lenses to selectively block light reflections from various objects. For example, eyeglasses with polarizing lenses are intended to block the glare reflected off road surfaces and other automobiles to which drivers are exposed during driving, as well as the glare reflected off water surfaces, which poses a problem in marine sports, and the glare reflected off snow surfaces, which is a problem in winter sports. Another function required of plastic lenses is the photochromic property, which refers to an ability of a lens to darken or change its color and reduce light transmission when exposed to high intensity light and fade when in a dark environment. There is also an increasing demand for lenses that have both the polarizing property and the photochromic property. While some glass lenses that combine the photochromic property with the polarizing property are already on the market, plastic lenses that are cost-effective but still exhibit the two properties at a sufficient level have never been put on the market due to technical difficulties.

Traditionally, polarizing plastic lenses have been produced by (1) stamping out a thick polarizing sheet and bending the stamped pieces into lenses (See, for example, Patent article No. 1 below) or (2) laminating a polarizing sheet over a lens substrate and further laminating a lens substrate over the polarizing sheet.

The technique (1) is employed in the production of polycarbonate polarizing lenses but is not suitable for the production of correction lenses and high precision plano lenses (See, for example, Patent article No. 1 below). The technique (2) can achieve only low productivity.

To address the above-described problems, several lens production techniques have been developed, including a technique (3) that involves integrating, by injection molding, a plastic to the back of a prebent polarizing sheet to form a lens substrate (See, for example, Patent article No. 2 below), and a technique (4) that involves sandwiching a polarizing sheet with a polymerizable composition and subsequently carrying out polymerization (See, for example, Patent article No. 3 below).

The technique (3) can be used to produce correction lenses and high-precision plano lenses and has thus overcome the drawback of the technique (1). This technique is currently used in the production of polycarbonate polarization lenses (See, for example, Patent article No. 2 below). The technique (4) is of considerable simplicity and potency. In the system of the technique (4) using diethylene glycol bis(allyl carbonate) to serve as a substrate, known is the method using a laminate that comprises triacetylcellulose (which may be referred to as "TAC," hereinafter) disposed on each side of a polarizing sheet made of a polyvinylalcohol resin.

In comparison with polarizing plastic lenses, photochromic plastic lenses have been produced mainly by "imbibing" technique (See, for example, Patent article No. 4 below). This technique, however, is only applicable to processes that use diethylene glycol bis(allyl carbonate), a compound commonly known as CR-39 (the compound is referred to as "CR-39," hereinafter).

Thus, several techniques have been proposed that can also be applied to processes that do not use CR-39. Among such techniques are a technique (5) in which a coating layer containing a photochromic pigment is disposed on a lens surface (See, for example, Patent article No. 5 below) and a technique (6) comprising directly adding a photochromic pigment to a lens substrate (See, for example, Patent article No. 6 below). Also proposed is a technique (7), which comprises preparing a laminate with photochromic function, depositing a polymerizable composition on each side of the laminate, and polymerizing the composition to form a lens substrate (See, for example, Patent article No. 7 below).

The technique (5), however, has a disadvantage that the limitation on the coat thickness makes it difficult to achieve sufficient contrast between the colored state and the uncolored state of the lens (See, for example, Patent article No. 4 below). The technique (6) fails to provide sufficient contrast and response time. The technique (7) is still only a concept and has yet to be realized.

To address the above-described problems, techniques for the production of photochromic lenses that rely on injection molding have been proposed. In one such technique, a laminate consisting of a photochromic layer sandwiched between layers of a polycarbonate resin is used to form a photochromic polycarbonate lens. Due to the development of high quality photochromic laminates (See, for example, Patent article No. 8 below), this technique is now being put to practical use.

Conventional techniques also exist for producing plastic lenses that feature both the polarizing property and the photochromic property. One such technique (8) involves laminating a photochromic layer on the surface of a polarizing plastic lens by imbibing technique (See, for example, Patent article No. 4 below).

Some of the techniques of this category are also applicable to processes that do not involve CR-39. Examples include a technique (9) in which a coating layer containing a photochromic pigment is laminated on the surface of a polarizing plastic lens (See, for example, Patent article No. 5 below); and a technique (10) comprising directly adding a photochromic pigment to a lens substrate (See, for example, Patent article No. 6 below).

An effort is also being made to develop laminates that exhibit both high polarizing property and high photochromic property (See, for example, Patent article No. 9).

As far as plastic polarizing lenses are concerned, the technique (4) is only applicable to limited types of lens substrates. In this technique, the polarizing film substrate or the polarizing laminate tends to come off the substrate upon polymerization and similar peeling is likely to occur after molding of the lenses.

Thus, diethylene glycol bis(allyl carbonate), a compound known as CR-39, is currently the only practical material that can be used in the technique (4) to form lens substrates: high index lenses such as those made of thiourethane resins still cannot be made by the technique (4). This is because conditions required for the cast polymerization of, for example, a thiourethane-based polymerizable composition to make high index lenses are significantly stricter than the conditions for polymerization of CR-39. Specifically, performance of the polarizing sheet in the high index lenses may be reduced depending on various polymerization conditions. For example, color variation may occur and the degree of polarization may be reduced. In addition, the polymerizable composition or its reaction product to form the lens may penetrate into the polarizing sheet or polarizing laminate. Furthermore, the adhesion between the lens substrate and the polarizing laminate or the polarizing sheet may be reduced after molding of the lens.

The cast polymerization process in which diethylene glycol bis(allyl carbonate), or CR-39, is used to serve as a lens substrate is the only process currently used for producing photochromic lenses at high productivity.

When the technique (8) is used to produce plastic lenses that have both the polarizing property and the photochromic property, only CR-39 can be used. The technique (9) has a disadvantage that the limitation on the coat thickness makes it difficult to achieve sufficient contrast between the uncolored state and the colored state of the lens (See, for example, Patent article No. 5 below). The technique (10) fails to provide sufficient contrast and response time.

Referenced Patent Articles

Patent article No. 1 Japanese Patent Examined Publication No. Hei 7-94154
Patent article No. 2 Japanese Patent Laid-Open Publication No. Hei 8-52817
Patent article No. 3 Japanese Patent Laid-Open Publication No. Hei 1-232006
Patent article No. 4 U.S. Pat. No. 5,130,353
Patent article No. 5 Japanese Patent Laid-Open Publication No. Sho 63-178193
Patent article No. 6 Japanese Patent Laid-Open Publication No. Hei 7-253633
Patent article No. 7 Japanese Patent Laid-Open Publication No. Sho 61-236521
Patent article No. 8 International Patent Publication No. WO 01/77740
Patent article No. 9 Japanese Patent Laid-Open Publication No. 2002-62423

DISCLOSURE OF THE INVENTION

To effectively produce high-index polarizing plastic lenses by cast polymerization, it is therefore essential to develop polarizing sheets or polarizing laminates that can withstand harsh conditions such as temperature and resistance to chemicals encountered during the cast polymerization process. It is also necessary to find ideal combinations of these sheets or laminates with lens precursors.

Totally different approaches than those employed for currently used CR-39 are required in the production of photochromic plastic lenses using high-index lenses made of materials such as a thiourethane polymer composition: it is essential to develop photochromic sheets or photochromic laminates that can withstand various harsh conditions encountered during the cast polymerization process. It is also necessary to find ideal combinations of these sheets or laminates with lens precursors.

The only possible process currently used for the production of polarizing/photochromic lenses is the cast polymerization process in which a polarizing plastic lens using CR-39 as a lens substrate is produced and a photochromic layer is then formed on the lens surface by imbibing technique.

High index lenses such as those made of thiourethane resins still cannot be made by the above-described technique. This is due to the same reasons as described above: performance of the polarizing sheet may be reduced (e.g. color variation may occur and the degree of polarization may be reduced); the polymerizable composition or its reaction product to form the lens may penetrate into the polarizing/photochromic laminate; and the adhesion between the lens substrate and the polarizing/photochromic laminate may be reduced after molding of the lens.

For these reasons, totally different approaches than those employed for currently used CR-39 are also required in the production of polarizing/photochromic plastic lenses using high-index lenses made of materials such as a thiourethane-based polymerizable composition: it is essential to develop polarizing/photochromic laminates that can withstand various harsh conditions encountered during the cast polymerization process. It is also necessary to find ideal combinations of these sheets or laminates with lens precursors.

In view of the foregoing description, it is an objective of the present invention to provide useful light control plastic lenses, coated sheet-like light control elements, and a method for producing light control plastic lenses. More specifically, the present invention provides light control plastic lenses, such as high index plastic lenses that are made by cast polymerization and have a polarizing property and/or a photochromic property. The present invention also provides coated sheet-like light control elements for use in the production of the lens bodies, as well as a production method of such light control plastic lenses.

The present inventors made still another effort in developing light control sheets and light control laminates that can ensure sufficient adhesion between the lens substrate and the light control sheet, such as polarizing sheets, photochromic sheets, and polarizing/photochromic sheets, not only when used with CR-39, but also when used with widely used materials such as thiourethane-based polymerizable compositions. These light control sheets and light control laminates are easy to apply to lenses during lens molding by cast polymerization and can easily be maintained before and after the application. The effort led to the discovery that a desirable light control plastic lens can be produced under the harsh conditions such as those of during the cast polymerization by coating a curable polymerizable composition on the surface of the light control sheet. In addition, the effort led to the discovery that a laminate can be formed by adhering a transparent sheet to at least one surface of the light control sheet and then applying a particular curable polymerizable composition over the transparent sheet, that such a laminate can be used in conjunction with a wide range of polymerizable lens compositions, and that the laminate is easy to bend and can be easily maintained before and after the bending. The present invention is also based on this discovery.

Accordingly, a first aspect of the present invention concerns a light control plastic lens that comprises a sheet-like light control element having at least a light control sheet. This light control plastic lens comprises the sheet-like light control element, a curable resin layer laminated on at least one surface of the sheet-like light control element, and a polymerizable lens resin layer laminated at least on the curable resin layer. The light control sheet preferably serves either as a polarizing sheet or a photochromic sheet or both.

The curable resin layer is preferably formed of (meth) acrylate resins. The (meth)acrylate resin is preferably at least one selected from the group consisting of urethane(meth) acrylate resins, polyester(meth)acrylate resins, and epoxy (meth)acrylate resins. The layer of the (meth)acrylate resin is preferably from 2 μm to 13 μm thick.

The sheet-like light control element may be a light control laminate. This light control laminate preferably comprises at least a light control sheet and a transparent sheet laminated on at least one surface of the light control sheet.

The polarizing sheet is preferably formed of a polyvinyl alcohol-based resin and preferably contains a dichromatic pigment. It is preferred that the polarizing sheet be further treated with a metal compound and boric acid.

The photochromic sheet is preferably formed of a polyurethane-based resin, which preferably contains a photochromic pigment. Such a photochromic pigment is preferably at least one selected from the group consisting of spirobenzopyran derivatives, naphthopyran derivatives, and spirooxazine derivatives. Preferably the polyurethane-based resin is further treated with a curing agent.

The transparent sheet is preferably formed of at least one selected from the group consisting of polycarbonate resins, cellulose resins, alicyclic polyolefin resins, and polyester resins. Of these, polycarbonate resins are particularly preferred. It is preferred that the transparent sheet made of a polycarbonate resin be 20 μm to 2 mm thick.

Preferably, the polymerizable lens resin layer contains a sulfur-containing polymerizable compound. This compound is preferably at least one selected from the group consisting of thiourethane-based polymerizable compounds and episulfide-based polymerizable compounds.

The polymerizable lens resin layer is preferably formed of an allyl carbonate-based resin.

A second aspect of the present invention concerns a coated sheet-like light control element for use in the production of a light control plastic lens including a sheet-like light control element having at least a light control sheet. The coated sheet-like element comprises the sheet-like light control element and a curable polymerizable composition film laminated on at least one surface of the sheet-like light control element. The light control sheet preferably serves either as a polarizing sheet or a photochromic sheet or both.

A third aspect of the present invention concerns a method for producing a light control plastic lens involving the use of a sheet-like light control element having at least a light control sheet. The method involves at least a coating step of coating at least one surface of the sheet-like light control element with a curable polymerizable composition; a curing step of curing the curable polymerizable composition film coated on the sheet-like light control element to form a curable resin layer; and a cast polymerization step in which the sheet-like light control element laminated with the curable resin layer is embedded in a polymerizable lens composition within a mold and the polymerizable lens composition is polymerized.

This production method may further include a bending step of bending the sheet-like light control element laminated with the curable resin layer into a lens shape.

In the production method of a light control plastic lens according to the present invention, the coated sheet-like light control element may be formed by adhering the coated transparent sheet, which is formed by coating one surface of the transparent sheet with the curable polymerizable composition, to at least one surface of a light control sheet.

The coated sheet-like light control element may be produced by applying the curable polymerizable composition to the transparent sheet of the sheet-like light control element, which is formed by adhering the transparent sheet to at least one surface of the light control sheet.

The light control sheet preferably serves either as a polarizing sheet or a photochromic sheet or both.

Various polymerizable lens compositions can be used in the production of the light control plastic lenses according to the present invention. Therefore, high index plastic lenses that are not only more lightweight, less breakable and, thus, much safer than glass lenses, but also have a polarizing property and/or a photochromic property can be provided.

The production method of a light control plastic lens in accordance with the present invention is useful in the production of light control plastic lenses that use a wide variety of lens substrates. The method is simple and is highly productive. The light control plastic lenses produced by the present method are not associated with a loss of optical characteristics of the light control sheets used. In particular, the light control properties of the lenses are less dependent on the properties of lens substrates. This allows the use of a wide range of lens materials in producing highly responsive light control lenses that offer good contrast.

Figure 1:
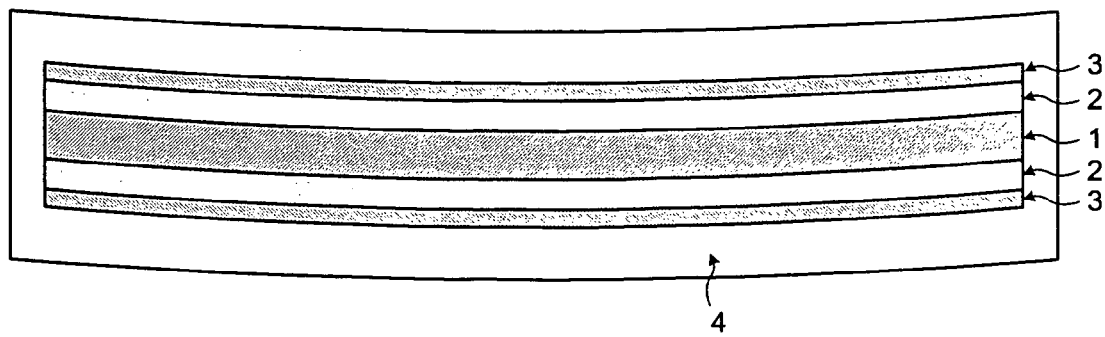
FIG. 1 is a schematic diagram showing one example of a light control plastic lens of the present invention that includes a sheet-like light control element to serve as a light control laminate.

Each mark in the FIG. 1-3 denotes as follows:

1: light control sheet, 2: transparent sheet, 3: (meth)acrylate-based resin layer (as curable resin layer), 3': (meth)acrylate-based resin composition film (as curable polymerizable composition film), 4: polymerizable lens resin layer, 5: polarizing sheet, 6: photochromic sheet.

BEST MODE FOR CARRYING OUT THE INVENTION

Several embodiments of the present invention will now be described.

Light Control Plastic Lens

A light control plastic lens according to the first aspect of the present invention includes a sheet-like light control element having at least a light control sheet. The light control plastic lens comprises the sheet-like light control element, a curable resin layer laminated onto at least one surface of the sheet-like light control element, and a polymerizable lens resin layer laminated at least over the curable resin layer.

The light control plastic lens has the curable resin layer laminated onto at least one surface of the sheet-like light control element. For example, the curable resin layer may be laminated onto one side of the sheet-like light control element, or it may be laminated onto both sides of the sheet-like light control element. A polymerizable resin layer formed of a cured polymerizable lens composition is further laminated at least over the curable resin layer. For example, the polymerizable resin layer may be laminated only on the curable resin layer, or it may be laminated over the curable resin layer and on the other surface of the sheet-like light control element.

The light control plastic leans is produced by using the coated sheet-like light control element that comprises the sheet-like light control element having at least one surface coated with the curable polymerizable composition. The coating allows the sheet-like light control element of the light control plastic lens to remain unaffected without deterioration under harsh conditions during production of the lens. The polymerizable lens composition polymerizes while retaining its transparency to form the polymerizable lens resin layer. Thus, the light control plastic lens according to the present invention encompasses light control plastic lenses made of various types of lens substrates, including those with high refractive indices.

As used herein, the term "light control plastic lens" refers to a plastic lens that can control the property of light entering eyes by having a polarizing property, a photochromic property, and a polarizing property in conjunction with a photochromic property (referred to as polarizing/photochromic property, hereinafter) (These properties are collectively referred to as "light control property," hereinafter). Specific applications of light control plastic lenses include light control plastic eyeglasses, plastic lens windows for automobiles and houses, lens windows, sun visors, ski goggles, and windshields of airplanes and motorcycles. Of these, applications of the plastic polarizing lenses, plastic photochromic lenses, and plastic polarizing/photochromic lenses in eyeglasses are particularly preferred.

The term "photochromic property" as used herein refers to an ability of a lens to color or change its color and reduce light transmission when exposed to high intensity light and lose its color when in a dark environment. The term "polarizing property" as used herein refers to an ability of a lens to selectively block light reflections. Polarizing lenses can effectively block the glare reflected off road surfaces and other automobiles to which drivers are exposed during driving, as well as the glare reflected off water surfaces, which poses a problem in marine sports, and the glare reflected off snow surfaces, which is a problem in winter sports. Thus, the eyeglasses with polarizing property offer improved visibility in certain conditions. This type of glasses is becoming an essential item especially in fishing since they allow the wearers to clearly view fish in water.

As used herein, the term "light control sheet" for use in the light control plastic lens of the present invention refers to a sheet-like element that has inherent light control property. Preferred light control sheets may include polarizing sheets, photochromic sheets, and polarizing/photochromic sheets.

The term "sheet-like light control element" as used herein refers to a sheet-like element that has a light control property and includes at least the above-described light control sheet with inherent light control property. The sheet-like light control element may be composed of a single layer or plural layers. The sheet-like light control element composed of plural layers is herein referred to a "light control laminate". Examples include those that can show inherent light control property irrespective of their thickness, such as polarizing sheets and photochromic sheets, and light control laminates including elements that show inherent light control property. Thus, the term "sheet-like light control element" is a concept encompassing at least light control sheets and light control laminates.

The term "curable resin layer" as used herein refers to a resin layer formed when the polymerizable compound contained in the curable polymerizable composition polymerizes upon exposure to external energy such as heat and UV rays. The curable resin layer may be formed by curing a curable polymerizable composition. Coating the curable polymerizable composition onto the sheet-like light control element prevents the element from deterioration by penetrating of chemicals such as lens substrates. Therefore, the light control plastic lens according to the present invention may essentially have no opaque. In addition, the technique of coating protects the sheet-like light control element from heat for polymerizing the lens substrates under the high temperature condition encountered during the cast polymerization process. Therefore, the light control plastic lens according to the present invention may essentially have no damage by heat.

The term "polymerizable lens resin layer" as used herein refers to a layer of a lens substrate laminated over at least part of the sheet-like light control element laminated with the curable resin layer.

In the light control plastic lens of the present invention, the sheet-like light control element may be provided in the form of a light control laminate. One example of such a light control plastic lens is schematically shown in FIG. 1.

Figure 2:
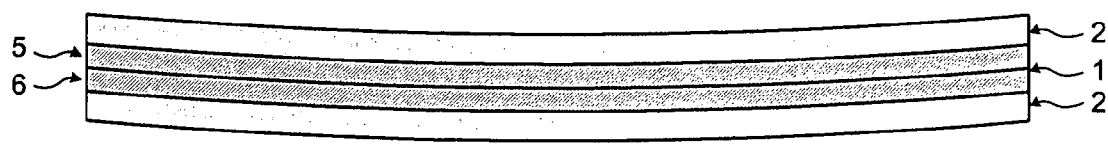
FIG. 2 is a schematic diagram showing one example of the light control laminate for use in the sheet-like light control element of the plastic light control lens of the present invention.

Referring to FIG. 1, a transparent sheet 2 is adhered to each side of a light control sheet 1 to form a sheet-like light control element to serve as a light control laminate. A curable resin layer 3 is laminated on each side of the sheet-like light control element. A polymerizable lens resin layer 4 is further laminated on, or covers, the curable resin layer 3 to form a light control plastic lens.

The curable resin layer in the light control plastic lens of the present invention may be formed of any resin that is highly resistant to various polymerizable compositions used in light control plastic lenses (which may be referred to as "polymerizable lens composition," hereinafter), can serve to maintain the light control property of the sheet-like light control element, and show a predetermine degree of adhesiveness. The term "curable resin" as used in the example showen in FIG. 1 is a resin formed when a precursor (meth)acrylate-based polymerizable composition polymerizes upon exposure to external energy such as heat and UV rays.

The (meth)acrylate-based resin is not limited to a particular type and may be any (meth)acrylate-based resin. The (meth)acrylate-based polymerizable composition refers to compositon containing a precursor of a (meth)acrylate-based resin, of which status is before curing by polymerization. The composition preferably has an ability to cure upon exposure to an active energy ray in terms of curing time and safety. The active energy ray is preferably a UV-ray. Of different (meth)acrylate-based resins, at least one selected from the group consisting of urethane(meth)acrylate-based resins, polyester(meth)acrylate-based resins, and epoxy(meth)acrylate-based resins is particularly preferred in terms of UV-curability.

The term "(meth)acrylate-based polymerizable composition" as used herein refers to a polymerizable composition containing at least one selected from the group consisting of acrylate-based polymerizable compounds and methacrylate-based polymerizable compounds. This composition contains a (meth)acrylate-based polymerizable monomer and/or polymerizable oligomer.

Preferably, the (meth)acrylate-based polymerizable composition is a mixture of a (meth)acrylate-based polymerizable oligomer and a (meth)acrylate-based polymerizable monomer. The polymerizable oligomer is preferably a polyfunctional (meth)acrylate-based oligomer, such as urethane (meth)acrylate-based oligomer, polyester(meth)acrylate-based oligomer, and epoxy(meth)acrylate-based oligomer. Of these, particularly preferred are urethane(meth)acrylate-based oligomers and polyester(meth)acrylate-based oligomers.

The urethane(meth)acrylate-based oligomer is not limited to a particular type and may be any urethane(meth)acrylate-based oligomer that includes in its structure urethane bonds and (meth)acryl groups and is composed of a polyisocyanate in conjunction with a polyol and a hydroxy(meth)acrylate.

Examples of the polyisocyanate include, but are not limited to, aromatic polyisocyanates, such as trilene diisocyanate, diphenyl methane diisocyanate, polymethylene polyphenyl polyisocyanate, toluidine diisocyanate, and naphthalene diisocyanate; hexamethylene diisocyanate, isophorone diisocyanate, xylylene diisocyanate, hydrogenated xylylene diisocyanate, and dicyclohexylmethane diisocyanate.

Examples of the polyol include polyether-based polyols, including propylene oxide- or ethylene oxide-added polyols, and polyester-based polyols, including adipates, polycaprolactones, and oligocarbonates.

Examples of the hydroxy(meth)acrylate include 2-hydroxyethyl(meth)acrylate, 2-hydroxymethyl(meth)acrylate, 2-hydroxypropyl(meth)acrylate, glycidyl(meth)acrylate, and pentaerythritoltri(meth)acrylate.

Many commercial products of urethane(meth)acrylate-based oligomers are on the market and are readily available, including BEAMSET 575, BEAMSET 551B, BEAMSET 550B, BEAMSET 505A-6, BEAMSET 504H, BEAMSET 510, BEAMSET 502H, BEAMSET 575CB, and BEAMSET 102 (each a urethane(meth)acrylate oligomer product manufactured by Arakawa Chemical Industries, Ltd.); PHOTOMER 6008 and PHOTOMER 6210 (each a urethane (meth)acrylate oligomer product manufactured by San Nopco Ltd.); NK OLIGO U-4HA, NK OLIGO U-108A, NK OLIGO U-1084A, NK OLIGO U-200AX, NK OLIGO U-122A, NK OLIGO U-340A, NK OLIGO U-324A, NK OLIGO UA-100, and NK OLIGO MA-6 (each a urethane (meth)acrylate oligomer product manufactured by Shin-Nakamura Chemical Co., Ltd.); ARONIX M-1100, ARONIX M-1200, ARONIX M-1210, ARONIX M-1310, ARONIX M-1600, and ARONIX M-1960 (each a urethane (meth)acrylate oligomer product manufactured by Toagosei Co., Ltd.); AH-600, AT-606, and UA-306H (each a urethane (meth)acrylate oligomer product manufactured by Kyoeisha Chemical Co., Ltd.); KAYARAD UX-2201, KAYARAD UX-2301, KAYARAD UX-3204, KAYARAD UX-3301, KAYARAD UX-4101, KAYARAD UX-6101, KAYARAD UX-7101, and KAYARAD UX-4101 (each a urethane(meth) acrylate oligomer product manufactured by Nippon Kayaku Co., Ltd.); SHIKOH UV-1700B, SHIKOH UV-3000B, SHIKOH UV-3300B, SHIKOH UV-3520TL, SHIKOH UV-3510TL, SHIKOH UV-6100B, SHIKOH UV-6300B, SHIKOH UV-7000B, SHIKOH UV-7210B, SHIKOH UV-7550B, SHIKOH UV-2000B, SHIKOH UV-2250TL, SHIKOH UV-2010B, SHIKOH UV-2580B, and SHIKOH UV-2700B (each a urethane(meth)acrylate oligomer product manufactured by Nippon Synthetic Chemical Industry Co., Ltd.); ART RESIN UN-9000PEP, ART RESIN UN-9200A, ART RESIN UN-9000H, ART RESIN UN-1255, ART RESIN UN-5200, ART RESIN UN-2111A, ART RESIN UN-330, ART RESIN UN-3320HA, ART RESIN UN-3320HB, ART RESIN UN-3320HC, ART RESIN UN-3320HS, and ART RESIN UN-6060P (each a urethane (meth)acrylate oligomer product manufactured by Negami Chemical Industrial Co., Ltd.); LAROMER UA19T, LAROMER LR8949, LAROMER LR8987, and LAROMER LR8983 (each a urethane(meth)acrylate oligomer product manufactured by BASF Co., Ltd.); DIABEAM UK6053, DIABEAM-UK6055, DIABEAM UK6039, DIABEAM UK6038, DIABEAM UK6501, DIABEAM UK6074, and DIABEAM UK6097 (each a urethane(meth) acrylate oligomer product manufactured by Mitsubishi Rayon Co., Ltd.); and EBECRYL 254, EBECRYL 264, EBECRYL 265, EBECRYL 1259, EBECRYL 4866, EBECRYL 1290K, EBECRYL 5129, EBECRYL 4833 and EBECRYL 2220 (each a urethane(meth)acrylate oligomer product manufactured by DAICEL-UCB Co., Ltd.). Preferably, these urethane(meth)acrylate-based polymerizable oligomers are polyfunctional oligomers in terms of solvent resistance, adhesion to the transparent sheet, and adhesion to the curable polymerizable composition. Of such polyfunctional urethane(meth)acrylate-based oligomers, NK OLIGO U-4HA and EBECRYL 1264 are particularly preferred.

The polyester(meth)acrylate-based oligomer is not limited to a particular type and may be any polyester(meth) acrylate-based oligomer. The polyester(meth)acrylate-based oligomer can be synthesized through dehydration condensation of a polybasic acid, a polyol, and a (meth)acrylic acid. Examples of the polyester(meth)acrylate-based oligomer include ARONIX M-6100, ARONIX M-7100, ARONIX M-8030, ARONIX M-8060, ARONIX M-8530, and ARONIX M-8050 (each a polyester(meth)acrylate oligomer product manufactured by Toagosei Co., Ltd.); LAROMER PE44F, LAROMER LR8907, LAROMER PE55F, LAROMER PE46T, and LAROMER LR8800 (each a polyester(meth)acrylate oligomer product manufactured by BASF Co., Ltd.); EBECRYL 80, EBECRYL 657, EBECRYL 800, EBECRYL 450, EBECRYL 1830, and EBECRYL 584 (each a polyester(meth)acrylate oligomer product manufactured by DAICEL-UCB Co., Ltd.); and PHOTOMER RCC13-429 and PHOTOMER 5018 (each a polyester(meth)acrylate oligomer product manufactured by San Nopco, Ltd.). Of these polyester(meth)acrylate-based polymerizable oligomers, EBECRYL 180 is particularly preferred.

The epoxy(meth)acrylate-based oligomer is not limited to a particular type and may be any epoxy(meth)acrylate-based oligomer. The epoxy(meth)acrylate-based oligomer has a structure in which a (meth)acrylic acid is added to an epoxy-based oligomer. Among such epoxy(meth)acrylate-based oligomers are those of bisphenol A-epichlorohydrin type, modified bisphenol A type, modified amine type, phenol novolack-epichlorohydrin type, aliphatic type, and alicyclic type. Examples of such an epoxy(meth)acrylate-based oligomer include LAROMER LR8986, LAROMER LR8713, and LAROMER EA81 (each an epoxy(meth) acrylate oligomer product manufactured by BASF Co., Ltd.); NK OLIGO EA-6310, NK OLIGO EA-1020, NK OLIGO EMA-1020, NK OLIGO EA-6320, NK OLIGO EA-7440, and NK OLIGO EA-6340 (each an epoxy(meth) acrylate oligomer product manufactured by Shin-Nakamura Chemical Co., Ltd.); and EBECRYL 3700, EBECRYL 3200, and EBECRYL 600 (each a epoxy(meth)acrylate oligomer product manufactured by DAICEL-UCB Co., Ltd.). Of these epoxy(meth)acrylate-based polymerizable oligomers, NK OLIGO EA-1020 is particularly preferred.

The (meth)acrylate-based polymerizable monomer is not limited to a particular type and may be any (meth)acrylate-based polymerizable monomer. Examples of the (meth)acrylate-based polymerizable monomer include mono-, di-, and poly-(meth)acrylate compounds of aliphatic alcohols, diols, and polyols having 2 to 20 carbon atoms; poly(meth)acrylate forms of terminal hydroxy compounds that have 30 or less carbon atoms and contain aliphatic ether bonds, ester bonds, or carbonate bonds branched with a polyol such as glycerol, trimethylolpropane, and pentaerythritol; and these compounds having an alicyclic compound or aromatic compound in their backbone.

Specific examples include 2-ethylhexylcarbitol (meth)acrylate, 2-hydroxyethyl acrylate, butanediol monoacrylate, polyethylene glycol(meth)acrylate, cyclopentenyl(meth)acrylate, cyclopentanyl(meth)acrylate, hexanediol(meth)acrylate, isobornyl(meth)acrylate, isobutyl(meth)acrylate, isooctyl(meth)acrylate, isodecyl(meth)acrylate, isostearyl (meth)acrylate, cyclopentanyldi(meth)acrylate, hexanedioldi(meth)acrylate, isobornyldi(meth)acrylate, butanedioldi(meth)acrylate, hexanedioldi(meth)acrylate, neopentyl glycol(meth)acrylate, neopentyl glycol di(meth)acrylate, nonylphenoxypolyethylene glycol(meth)acrylate, 1,9-nonanediol di(meth)acrylate, 1,10-decanediol di(meth)acrylate, EO-modified bisphenol A di(meth)acrylate, PO-modified bisphenol A di(meth)acrylate, EO-modified neopentyl glycol di(meth)acrylate, PO-modified neopentyl glycol di(meth)acrylate, polypropylene glycol di(meth)acrylate, tricyclodecane dimethanol di(meth)acrylate, pentaerythrytol tri(meth)acrylate, trimethylolpropane tri(meth)acrylate, EO-modified trimethylolpropane tri(meth)acrylate, and PO-modified trimethylolpropane tri(meth)acrylate. Of these acrylate-based polymerizable monomers, 1,9-nonanediol di(meth)acrylate and PO-modified neopentyl glycol di(meth)acrylate are particularly preferred.

The (meth)acrylate-based polymerizable compound contained in the (meth)acrylate-based polymerizable composition may be a single (meth)acrylate-based polymerizable compound or it may be a combination of two or more (meth)acrylate-based polymerizable compounds.

The above-described (meth)acrylate-based polymerizable compositions may be used in the form of a mixture of a (meth)acrylate-based polymerizable oligomer and a (meth)acrylate-based polymerizable monomer.

While the oligomer and the monomer may be mixed at any proportion, it is preferred that the amount of the (meth)acrylate-based polymerizable monomer be in the range of 20 wt % to 80 wt % with respect to the total amount of the monomer and the oligomer. The amount of the monomer in this range is preferred in terms of handleability.

The film thickness of the (meth)acrylate-based polymerizable composition is preferably from 0.1 μm to 20 μm, and more preferably 2 μm to 13 μm, in terms of the resistance and adhesiveness to the polymerizable composition and susceptibility to cracking during bending.

The sheet-like light control element for use in the light control plastic lens of the present invention may be provided in the form of a light control laminate, which composed of plural layers described above. The light control laminate preferably comprises a light control sheet and a transparent sheet coated on at least one surface of the light control sheet. Again, the light control sheet preferably serves either as a single layer of polarizing sheet or a photochromic sheet, or plural layers of polarizing sheet and a photochromic sheet.

A light control laminate having polarizing property may herein be referred to a polarizing laminates. A light control laminate having photochromic property may herein be referred to a photochromic laminates. In addition, a light control laminate having both polarizing property and photochromic property may herein be abbreviated to a polarizing/photochromic laminates.

If the light control laminate consists of a polarizing sheet and a transparent sheet, then the sheet-like light control element shows a polarizing property. If the light control laminate consists of a photochromic sheet and a transparent sheet, then the sheet-like light control element shows a photochromic property. If the light control laminate consists of a polarizing/photochromic sheet and a transparent sheet, then the sheet-like light control element shows a polarizing/photochromic property.

The polarizing sheet is not limited to a particular type and may be any polarizing sheet as long as it has some heat resistance. Preferably, the polarizing sheet may be formed of a polyvinyl alcohol-based resin.

The polyvinyl alcohol resin is not limited to a particular type and may be any polyvinyl alcohol that employs common polyvinyl alcohol-based film. Specific examples of the polyvinyl alcohol-based resin include polyvinyl alcohol resins, poly(ethylene/vinyl acetate)copolymer resins, polyvinyl butyral resins, and polyvinyl acetal resins. Of these polyvinyl alcohol-based resins, polyvinyl alcohol resins are particularly preferred.

The thickness of the polarizing sheet is not limited to a particular value and may preferably be from 10 μm to 50 μm. The polarizing sheet is easy to break when it is too thin, whereas the transmittance thereof may be decreased when it is too thick.

The polarizing sheet preferably contains a dichromatic pigment. Such a polarizing sheet exhibits high heat resistance. For example, the above-described polyvinyl alcohol resin may be stained by immersing in a solution of dichromatic pigment at room temperature to 50° C.

Examples of the pigment for use in the production of the polarizing sheet include Chrysophenine (C.I. 24895), Chlorantine Fast Red (C.I. 28160), Sirius Yellow, (C.I. 29000), Benzopurpurin (C.I. 23500), Direct Fast Red (C.I. 23630), Brilliant Blue B (C.I. 24410), Chlorazol Black BH (C.I. 22590), Direct Blue 2B (C.I. 22610), Direct Sky Blue (C.I. 24400), Diamine Green (C.I. 30295), Solophenyl Blue 4GL (C.I. 34200), Direct Copper Blue 2B (C.I. 24185, Nippon Brilliant Violet BK conc. (C.I. 27885), Congo Red (C.I. 22120), and Acid Black (C.I. 20470). These pigments may be used in combination of two or more pigments depending on the desired purpose. The numbers in the parentheses are Color Index Numbers according to *Senryo Binran* (Catalogue of Dyes and Pigments) New ed., Society of Synthetic Organic Chemistry, Japan (1970) Maruzen.

Preferably, the polarizing sheet is further treated with a metal compound and boric acid to provide high heat resistance and solvent resistance.

Specifically, this treatment is carried out by stretching the polarizing sheet stained in the dichromatic pigment solution while or after the sheet is immersed in a mixed solution of the metal compound and boric acid. Alternatively, the polarizing sheet stained and stretched in the dichromatic pigment solution may be immersed in a mixed solution of the metal compound and boric acid.

While each transitional metal in any of the fourth, fifth, or sixth period of the periodic table can form a metal compound that provides the heat resistance and solvent resistance, acetates, nitrates, and sulfates of the fourth period transitional metals, such as chromium, manganese, cobalt, nickel, copper, and zinc, are economically preferred. Of these, compounds comprising nickel, manganese, cobalt, zinc, and copper are inexpensive and can effectively provide the desired properties, and are thus particularly preferred.

Examples of the metal compound include manganese (II) acetate tetrahydrate, manganese (III) acetate dihydrate, manganese (II) nitrate hexahydrate, manganese (II) sulfate pentahydrate, cobalt (II) acetate tetrahydrate, cobalt (II) nitrate hexahydrate, cobalt (II) sulfate heptahydrate, nickel (II) acetate tetrahydrate, nickel (II) nitrate hexahydrate, nickel (II) sulfate hexahydrate, zinc (II) acetate, zinc (II) sulfate, chromium (III) nitrate nonahydrate, copper (II) acetate monohydrate, copper (II) nitrate trihydrate, and copper (II) sulfate pentahydrate. These metal compounds may be used either individually or in combination of more than two.

In order to impart the heat resistance and solvent resistance to the polarizing sheet, the amount of the metal compound in the polarizing sheet is preferably in the range of 0.2 to 20 mg, and more preferably 1 to 5 mg (as measured by the amount of metal) for 1 g of the polarizing sheet. The amount of the boric acid is preferably in the range of 0.3 to 30 mg and more preferably 0.5 to 10 mg (as measured by the amount of boron) for 1 g of the polarizing sheet. The composition of the solution used for the treatment is adjusted to provide the respective components in the specified amounts: the solution preferably contains the metal compound at a concentration of 0.5 g/L to 30 g/L and the boric acid at a concentration of 2 g/L to 20 g/L.

The amount of the metal compound and boric acid in the polarizing sheet can be determined by atomic absorption analysis.

The polarizing sheet is typically immersed in the solution of the metal compound and boric acid at room temperature to 50° C. for 5 to 15 minutes and is subsequently heated at a temperature of 70° C. or above, preferably at 90 to 120° C., for 1 to 120 minutes, preferably 5 to 40 minutes.

The polarizing laminate may consist of the polarizing sheet and a transparent sheet applied to at least one surface of the polarizing sheet. In the polarizing laminate, the transparent sheet may be applied to either one or both surfaces of the polarizing sheet.

The transparent sheet applied to at least one surface of the polarizing sheet is somewhat heat resistant and serves to prevent deterioration of the polarizing sheet during cast polymerization.

The use of the polarizing laminate allows the curable polymerizable composition to be applied either directly to the surface of a common polarizing laminate or in the form of a coated transparent sheet that is obtained by applying the curable polymerizable composition to the surface of a transparent sheet, for producing a coated sheet-like polarizing element.

The transparent sheet used in the polarizing laminate will be described later.

In the polarizing laminate, the transparent sheet and the polarizing sheet may be adhered to one another by an adhesive. Examples of the adhesive include thermosetting adhesives and UV-curable adhesives, such as acryl-based resins, urethane-based resins, epoxy-based resins, and urethane acrylate-based resins.

The lamination of the transparent sheet onto the polarizing sheet is typically carried out by depositing the transparent sheet on each side of the polarizing sheet in a "sandwich" fashion. In some applications, the transparent sheet may be applied to only one side of the polarizing sheet, leaving the other side exposed.

The photochromic sheet is not limited to a particular type and may be any photochromic sheet that has a predetermined certain heat resistance. The photochromic sheet is preferably formed of a polyurethane-based resin. While this polyurethane-based resin may be any polyurethane resin that has a predetermined certain heat-resistance, the resin is preferably a two solution-type thermosetting polyurethane resin that includes a polyurethane prepolymer and a curing agent. The photochromic sheet made of such a polyurethane resin is preferred because of its quick response in light modulation, its high workability and durability.

One preferred example of the polyurethane prepolymer is a compound that is obtained by reacting a diisocyanate compound with a polyoxyalkylenediol at a predetermined ratio and has an isocyanate group on each end of the molecule.

Examples of the diisocyanate compound for use in the polyurethane prepolymer include diphenylmethane-4,4'-diisocyanate, trilene diisocyanate, hexamethylene diisocyanate, isophorone diisocyanate, 4,4'-dicyclohexylmethane diisocyanate, lysine isocyanate, and hydrogenated xylylene diisocyanate. Of these, diphenylmethane-4,4'-diisocyanate is preferred.

Examples of the polyoxyalkylenediol for use in the polyurethane prepolymer include polypropylene glycol, polyethylene glycol, and polyoxytetramethylene glycol. Of these, polypropylene glycols having a degree of polymerization of 5 to 30 are preferred.

The polyurethane prepolymer typically has a number average molecular weight of 500 to 5000, preferably 1500 to 4000, and more preferably 2000 to 3000. As used herein, the term "number average molecular weight" refers to an average molecular weight determined by techniques such as end group analysis, ebulliometry, cryoscopy, osmometry, and gel permeation chromatography.

The curing agent may be any compound that has two or more hydrogen groups. Examples include polyurethane polyols, polyether polyols, polyester polyols, acryl polyols, polybutadiene polyols, and polycarbonate polyols. Of these, polyurethane polyols that have terminal hydroxyl groups and are obtained from reactions of a particular isocyanate and a particular polyol are preferred. Particularly preferred are polyurethane polyols that have a hydroxyl group at least on each terminal and are derived from a diisocyanate compound and a polyol.

Examples of the diisocyanate compound include diphenylmethane-4,4'-diisocyanate, trilene diisocyanate, hexamethylene diisocyanate, isophorone diisocyanate, 4,4'-dicyclohexylmethane diisocyanate, lysine isocyanate, and hydrogenated xylylene diisocyanate. Of these, trilene diisocyanate is preferred.

The polyol may be one obtained from reactions of trimethylolpropane or a similar compound with ethylene oxide or propylene oxide. Of such polyols, polypropylene glycol derivatives having a degree of polymerization of 5 to 30 are preferred.

The curing agent typically has an average molecular weight of 500 to 5000, preferably 1500 to 4000, and more preferably 2000 to 3000.

To adjust viscosity, a solvent such as ethyl acetate and tetrahydrofuran may be added to the polyurethane prepolymer and the curing agent. The solvent facilitates uniform dispersion of the photochromic compound through the urethane resin.

The photochromic compound to serve as the photochromic pigment for use in the present invention may be any photochromic compound compatible with the polyurethane prepolymer and may be a commercially available organic photochromic compound. Preferred examples of the organic photochromic compound are spirobenzopyran derivatives, naphthopyran derivatives, and spirooxazine derivatives, each having a high photochromic property.

Specific examples of the spirobenzopyran derivative include 1,3,3-trimethylspiro(indoline-2,2'-[2H]-1'-benzopyran), 1,3,3-trimethylspiro(indoline-8'-nitro-2,2'-[2H]-1'-benzopyran), 1,3,3-trimethylspiro(indoline-6'-hydroxy-2,2'-[2H]-1'-benzopyran), 1,3,3-trimethylspiro(indoline-8'-methoxy-2,2'-[2H]-1'-benzopyran), 5-chloro-1,3,3-trimethylspiro(indoline-2,2'-[2H]-1'-benzopyran), 1,3,3-trimethylspiro(indoline-6',8'-dibromo-2,2'-[2H]-1'-benzopyran), 1,3,3,4,7-pentamethylspiro(indoline-8'-ethoxy-2,2'-[2H]-1'-benzopyran), 5-chloro-1,3,3-trimethylspiro(indoline-6'-nitro-2,2'-[2H]-1'-benzopyran) and 5-chloro-1,3,3-trimethylspiro(indoline-6',8'-dinitro-2,2'-[2H]-1'-benzopyran).

Specific examples of the naphthopyran derivatives include 1,3,3-triphenylspiro(indoline-2,3'-[3H]-naphtho-(2,1-b)-pyran), 1-(2,3,4,5,6-pentamethylbenzyl)-3,3-dimethylspiro(indoline-2,3'-[3H]-naphtho-(2,1-b)-pyran), 1-(2-methoxy-5-nitrobenzyl)-3,3-dimethylspiro(indoline-2,3'-[3H]-naphtho-(2,1-b)-pyran), 1-(2-nitrobenzyl)-3,3-dimethylspiro(indoline-2,3'-[3H]-naphtho-(2,1-b)-pyran), and 1-(2-naphthylmethyl)-3,3-dimethylspiro(indoline-2,3'-naphtho(2,1-b)-pyran.

Specific examples of the spirooxazine compound include 1,3,3,4,5-pentamethylspiro(indoline-2,3'-[3H]-naphtho-(2,1-b)-(1,4)-oxazine), 1,3,3,4,6-pentamethylspiro(indoline-2,3'-[3H]-naphtho-(2,1-b)-(1,4)-oxazine), 1,3,3-trimethylspiro(indoline-2,3'-[3H]-naphtho-2,1-b)-(1,4)-oxazine, 5-methoxy-1,3,3-trimethylspiro(indoline-2,3'-[3H]-naphtho-2,1-b)-(1,4)-oxazine, 1,3,3-trimethylspiro(indoline-6'-(1-piperidyl)-2,3'-[3H]-naphtho-2,1-b)-(1,4)-oxazine, 1,3,3-trimethylspiro(indoline-6'-(1-morpholyl)-2,3'-[3H]-naphtho-(2,1-b)-(1,4)-oxazine), 1,3,3,4,5-pentamethylspiro(indoline-6'-(1-piperidyl)-2,3'-[3H]-naphtho-(2,1-b)-(1,4)-oxazine), 1,3,3,5,6-pentamethylspiro(indoline-6'-(1-piperidyl)-2,3'-[3H]-naphtho-(2,1-b)-(1,4)-oxazine), 1,3,3-trimethylspiro(indoline-6'-(1-piperidyl)-9'-(methoxy)-2,3-[3H]-naphtho-(2,1-b)-(1,4)-oxazine), 5-chloro-1,3,3-trimethylspiro(indoline-2,3'-[3H]-naphtho-2,1-b)-(1,4)-oxazine, 4,7-diethoxy-1,3,3 -trimethylspiro(indoline-2,3'-[3H]-naphtho-2,1-b)-(1,4)-oxazine, 1,3,3,5-tetramethylspiro(indoline-9'-(methoxy)-2,3'-[3H]-naphtho-2,1-b)-(1,4)-oxazine, 1-isopropyl-3,3,5-trimethylspiro(indoline-2,3'-[3H]-naphtho-2,1-b)-(1,4)-oxazine, 1-(p-chlorobenzyl)-3,3'-dimethylspiro(indoline-2,3'-[3H]-naphtho-2,1-b)-(1,4)-oxazine, and 1,3,3-trimethylspiro(indoline-2,2'-[2H]-phenanthro-9,10-b)-(1,4)-oxazine.

Of these organic photochromic compounds, spirooxazine derivatives are particularly preferred in terms of light resistance.

To ensure product life, various stabilizers are preferably added to the thermosetting polyurethane resin layer containing the photochromic compound. Among such stabilizers are hindered amine light stabilizers and antioxidants such as hindered phenols.

Examples of the hindered amine light stabilizer include bis(2,2,6,6-tetramethyl-4-piperidyl)sebacate, bis(1,2,2,6,6-pentamethyl-4-piperidyl)sebacate, bis(1,2,2,6,6-pentamethyl-4-piperidyl)-2-(3,5-di-tert-butyl-4-hydroxybenzyl)-2-n-butylmalonate, 1-methyl-8-(1,2,2,6,6-pentamethyl-4-piperidyl)-sebacate, 1-[2-[3-(3,5-di-tert-butyl-4-hydroxyphenyl)propionyloxy]ethyl]-4-[3-(3,5-di-tert-butyl-4-hydroxyphenyl)propionyloxy]-2,2,6,6-tetramethylpiperidine, 4-benzoyloxy-2,2,6,6-tetramethylpiperidine, tetrakis(2,2,6,6 -tetramethyl-4-piperidyl)-1,2,3,4-butane-tetracarboxylate, triethylenediamine, and 8-acetyl-3-dodecyl-7,7,9,9-tetramethyl-1,3,8-triazaspiro[4,5]decane-2,4-dione. In addition to these agents, nickel-based UV stabilizers, such as [2,2'-thiobis(4-tert-octylphenolate)-2-ethylhexylaminenickel, and 3,5-di-t-butyl-4-hydroxybenzyl.monoethylphosphate nickel complex, nickel.dibutyl-dithiocarbamate, may also be used. Particularly preferred hindered amine-based light stabilizers are those having only tertiary amines. Specific examples are condensation products of bis(1,2,2,6,6-pentamethyl-4-piperidyl)-sebacate, bis(1,2,2,6,6-pentamethyl-4-piperidyl)-2-(3,5-di-tert-butyl-4-hydroxybenzyl)-2-n-butylmalonate, or 1,2,2,6,6-pentamethyl-4-piperidinol/tridecylalcohol and 1,2,3,4-butanetetracarboxylic acid.

The antioxidant may be a hindered phenol or other antioxidants. Of different antioxidants, phenol-based antioxidants, thiol-based antioxidants, and phosphite-based antioxidants are preferred.

Examples of the phenol-based antioxidant include 1,1,3-tris(2-methyl-4-hydroxy-5-tert-butylphenyl)butane, 2,2'-methylenebis(4-ethyl-6-tert-butylphenol), tetrakis-[methylene-3-(3',5'-di-tert-butyl-4'-hydroxyphenyl)propionate] methane, 2,6-di-tert-butyl-p-cresol, 4,4'-thiobis(3-methyl-6-tert-butylphenol), 4,4'-butylidene bis(3-methyl-6-tert-butylphenol), 1,3,5-tris(3',5'-di-tert-butyl-4'-hydroxybenzyl)-S-triazine-2,4,6-(1H, 3H, 5H)trione, stearyl-β-(3,5-di-tert-butyl-4-hydroxyphenyl) propionate, triethyleneglycol bis[3-(3-tert-butyl-5-methyl-4-hydroxyphenyl)propionate], 3,9-bis[1,1-di-methyl-2-[β-(3-tert-butyl-4-hydroxy-5-methylphenyl)propionyloxy]ethyl]-2,4,8,10-tetraoxaspiro[5,5]undecane, and 1,3,5-trimethyl-2,4,6-tris(3,5-di-tert-butyl-4-hydroxybenzyl)benzene. Particularly preferred phenol-based antioxidants are those having a molecular weight of 550 or higher.

Examples of the thiol-based antioxidant include distearyl-3,3'-thiodipropionate and pentaerythritol-tetrakis-(β-lauryl-thiopropionate).

Examples of the phosphite-based antioxidant include tris (2,4-di-tert-butylphenyl)phosphite, distearylpentaerythritol diphosphite, di(2,6-di-tert-butylphenyl)pentaerythritol diphosphite, bis-(2,6-di-tert-butyl-4-methylphenyl)-pentaerytritol diphosphite, tetrakis(2,4-di-tert-butylphenyl)4,4'-biphenylene-diphosphonite, and 2,2'-methylenebis(4,6-di-tert-butylphenyl)octylphosphite.

The photochromic laminate can be made by adhering the transparent sheet to the prefabricated photochromic sheet with an adhesive. Examples of this adhesive include thermosetting adhesives and UV-curable adhesives, such as acryl-based resins, urethane-based resins, epoxy-based resins, and urethane acrylate-based resins.

A thermosetting polyurethane resin containing a photochromic compound can serve also as an adhesive layer. Thus, the photochromic laminate can be made also by coating the transparent sheet with such a thermosetting polyurethane resin containing a photochromic compound and then heating the coated sheet.

The photochromic laminate including a photochromic sheet may consist of the photochromic sheet and the transparent sheet applied to at least one surface of the photochromic sheet. In the photochromic laminate, the transparent sheet may be applied to either one or both surfaces of the photochromic sheet.

The transparent sheet applied to at least one surface of the photochromic sheet is somewhat heat resistant and serves to prevent deterioration of the photochromic sheet during cast polymerization.

The use of the photochromic laminate allows the curable polymerizable composition to be applied either directly to the surface of a common photochromic laminate or in the form of a coated transparent sheet that is obtained by applying the curable polymerizable composition to the surface of a transparent sheet, for producing coated sheet-like photochromic element. The thickness of the photochromic sheet is not limited to a particular value and may preferably be 10 μm to 200 μm.

The transparent sheet used in the photochromic laminate will be described later.

Described below is a production process of one exemplary photochromic laminate consisting of at least one polycarbonate transparent sheet and a thermosetting polyurethane resin layer (photochromic sheet) containing a photochromic compound and laminated with the transparent sheet.

To a solution obtained by diluting a polyurethane prepolymer with a specific organic solvent, a photochromic compound is added in an amount of 0.2 to 5 wt % with respect to the solid resin component. A hindered amine light stabilizer, an antioxidant, and/or other additives are then added in an amount of 0.1 to 5 wt % with respect to the solid resin component and the mixture is stirred/mixed until uniform. Subsequently, an amount of a curing agent is added so that the ratio (I/H) of the isocyanate groups (I) to the hydroxyl groups (H) of the curing agent is from 0.9 to 20, preferably from 1 to 10. The mixture is further stirred to form a solution, which preferably contains 40 to 90 wt % of the polymer. Using a doctor blade, this solution is applied to one surface of a transparent polycarbonate sheet to a thickness of 50 to 1000 μm. The coated polycarbonate sheet is then heated and dried until the coated surface contains substantially no solvent. Another transparent polycarbonate sheet is placed over and adhered to the coated surface of the synthetic resin sheet to form a "sandwich" construction. The heating process is typically carried out at 20 to 50° C. for 30 to 120 min. The resulting laminated sheet is heated to cure the urethane prepolymer containing the curing agent to obtain a transparent synthetic resin laminate. The curing process is typically carried out at 60 to 140° C. for 2 hours to 1 week.

Examples of the diluent used in the production of the photochromic laminate include hydrocarbons, such as hexane, heptane, octane, cyclohexane, toluene, xylene, and ethylbenzene; esters, such as ethyl acetate, methyl acetate, isopropyl acetate, n-propyl acetate, isobutyl acetate, n-butyl acetate, isoamyl acetate, methyl propionate, and isobutyl propionate; ketones, such as acetone, methyl ethyl ketone, diethyl ketone, methyl isobutyl ketone, acetyl acetone, and cyclohexyl ketone; ether esters, such as cellosolve acetate (2-ethoxyethyl acetate), diethylene glycol diacetate, ethylene glycol mono-n-butylether acetate, and propylene glycol monomethyl ether acetate; tertiary alcohols, such as diacetone alcohol and tert-amylalcohol; and tetrahydrofuran. Of these, ethyl acetate, tetrahydrofuran, and toluene are preferred.

A polarizing/photochromic sheet that has a polarizing/photochromic property can be made by adhering the polarizing sheet and the photochromic sheet to each other. Alternatively, the polarizing/photochromic sheet may be made by applying to the polarizing sheet a thermosetting polyurethane resin containing the afore-mentioned photochromic compound, and subsequently heating the coated polarizing sheet. The latter process is preferred since applying heat to the transparent sheet and the polarizing sheet adhered together by the thermosetting polyurethane resin containing the photochromic compound can make the polarizing/photochromic laminate.

A polarizing/photochromic laminate to serve as a light control laminate having a polarizing/photochromic property preferably comprises at least the polarizing/photochromic sheet and a transparent sheet coated on at least one surface of the polarizing/photochromic sheet. One example of such a polarizing/photochromic laminate is schematically shown in FIG. 2. The polarizing/photochromic laminate comprises: a light control sheet 1 consisting of a polarizing sheet 5 and a photochromic sheet 6; and a transparent sheet 2.

The polarizing/photochromic laminate is not limited to a particular type and may be any laminate having a different polarizing/photochromic property. One example of such polarizing/photochromic laminates is a laminate consisting of a polarizing/photochromic sheet, which is provided in the form of a laminate of a polarizing/photochromic sheet, and a transparent sheet coated on at least one surface of the polarizing/photochromic sheet. The polarizing/photochromic laminate may be a laminate made by the above-described manner; adhering the polarizing sheet and the transparent sheet to each other with an adherent thermosetting polyurethane resin, and heating the laminate.

The transparent sheet applied to at least one surface of the polarizing sheet or the photochromic sheet is somewhat heat resistant and serves to prevent alteration of the polarizing sheet or the photochromic sheet without deterioration during cast polymerization.

The use of the polarizing/photochromic laminate allows the curable polymerizable composition to be applied either directly to the surface of a common polarizing/photochromic laminate or in the form of a coated transparent sheet that is obtained by applying the curable polymerizable composition to the surface of a transparent sheet, for producing a coated sheet-like light control element. In this manner, the polarizing/photochromic laminate significantly facilitates the production process.

As previously described, the thermosetting polyurethane resin containing a photochromic compound may be prepared as a composition that can itself serve as an adhesive layer showing a sufficient adhesion to both the polycarbonate transparent sheet and the polarizing sheet. Thus, it is preferred in the production of the polarizing/photochromic laminate to adhere the transparent sheet and the polarizing sheet to each other using the thermosetting polyurethane resin containing a photochromic compound.

The thermosetting polyurethane resin containing a photochromic compound may be applied by using any of commonly used techniques, including batch processes, such as spin coat, doctor blade, spray, and flow coat; dip processes, such as gravure roll, micro gravure roll, and coater die; and continuous processes. Uniform coating thickness can lead to uniform color and uniform optical characteristics and is thus preferred.

In the polarizing/photochromic laminate using the thermosetting polyurethane resin containing a photochromic compound, the other surface of the polarizing sheet may be left exposed since the surface can be directly subjected to bending and polymerization with the polymerizable lens composition. However, this surface is preferably laminated with a transparent sheet to further improve workability and handleability. In such a case, the transparent sheet may be laminated by adhering it using a common adhesive. The thickness of the photochromic sheet is not limited to a particular value and may preferably be from 10 µm to 200 µm except the transparent sheet. The thickness of the polarizing sheet is not limited to a particular value and may preferably be from 10 µm to 50 µm. The polarizing sheet is easy to break when it is too thin, whereas the transmittance thereof may be decreased when it is too thick.

Examples of such adhesives include thermosetting adhesives and UV-curable adhesives, such as acryl-based resins, urethane-based resins, epoxy-based resins, and urethane acrylate-based resins Of these, urethane-based adhesives are preferred. While the adhesive may be applied to any thickness, an insufficient adhesion can result when it is too thin, whereas the operability upon bending may be affected when it is too thick, as may the optical characteristics. Thus, the adhesive is preferably applied to a thickness of 1 µm to 20 µm. The adhesive may be applied using the same techniques as those used to apply the photochromic polymerizable composition. Uniform coating thickness is preferred.

In the polarizing/photochromic laminate, the polarizing sheet may be arranged in front of the photochromic sheet, or the other way around. It is more preferred, however, to arrange the photochromic sheet on the object side (facing the light source) and the polarizing sheet behind the photochromic sheet for a better photochromic performance.

The transparent sheet for use in the light control plastic lens of the present invention is not limited to a particular type and may be any transparent sheet that has a predetermined certain heat resistance. Setting the transparent sheet allows the light control lens to improve structural strength thereof. In addition, bending process can be easily performed for the light control plastic lens with the transparent sheet. Thus, the yield of the products can be improved.

Such a transparent sheet may be made of materials such as polycarbonate resins, cellulose resins, alicyclic polyolefin resins, amorphous polyolefin resins, polyacrylate resins, polysulfone resins, triacetyl cellulose resins, and polyester resins. Of these, preferred are polycarbonate resins, cellulose resins, such as cellulose acetate (including TAC), propyl cellulose, and cellulose acetate butyrate, acrylic resins, polyethylene naphthalate (referred to as "PEN," hereinafter), polyethylene terephthalate (referred to as "PET," hereinafter), fluorene polyester resins (which show good optical characteristics and are referred to as "OKPs," hereinafter), alicyclic olefin resins (referred to as "APOs," hereinafter), such as ARTON, Zeonoa, and APEL. Of these, polycarbonate resins are particularly preferred because of their mechanical strength and response to light.

The polycarbonate resin for use in the present invention may be a polymer produced from a bisphenol compound such as 2,2-bis(4-hydroxyphenyl)alkane and 2,2-bis(4-hydroxy-3,5-dihalogenophenyl)alkane using a known technique. The polycarbonate resin may include in its molecular backbone structural units derived from a fatty acid diol and containing ester bonds. One preferred example is polycarbonate resins derived from 2,2-bis(4-hydroxyphenyl)propane.

While the material of the transparent sheet may have any molecular weight, it preferably has a viscosity-average molecular weight of 17,000 to 40,000, more preferably 20,000 to 30,000 in terms of formability and mechanical strength.

The transparent sheet typically has a thickness of 20 µm to 2 mm and preferably 50 µm to 1 mm when it is needed to form a curved surface.

The transparent sheet may be formed of one or more of the above-described resins.

The polymerizable lens resin for use in the light control plastic lens of the present invention may include a wide range of polymerizable compositions commonly used in lens substrates. Almost every commercial polymerizable composition product for lens substrates can be directly used for the polymerizable lens composition of the present invention. A wide variety of polymerizable compositions can be used, not to be limited to CR-39. Such a polymerizable composition preferably contains a sulfur-containing polymerizable composition. Preferred examples are high index polymerizable lens compositions such as thiourethane-based polymerizable composition and episulfide-based polymerizable composition.

The thiourethane-based polymerizable composition comprises a combination of an isocyanate and a thiol. (Note that polymer in the composition may include co-polymer and the composition may be a mixture of various types of polymer.).

Examples of the iso(thio)cyanate compounds used in the thiourethane-based resin composition include diethylene diisocyanate, tetramethylene diisocyanate, hexamethylene diisocyanate, trimethylhexamethylene diisocyanate, cyclohexane diisocyanate, 1,3-bis(isocyanatomethyl)cyclohexane, isophorone diisocyanate, 2,6-bis(isocyanatomethyl) decahydronaphthalene, lysine triisocyanate, 2,4-tolylene diisocyanate, 2,6-tolylene diisocyanate, o-tolidine diisocyanate, 4,4'-diphenylmethanediisocyanate, diphenylether diisocyanate, 3-(2'-isocyanatecyclohexyl)propylisocyanate, tris(phenylisocyanate)thiophosphate, isopropylidene-bis(cyclohexylisocyanate), 2,2'-bis(4-isocyanatenyl)propane, triphenylmethanetriisocyanate, bis(diisocyanatetolyl)phenylmethane, 4,4',4''-triisocyanate-2,5-dimethoxyphenylamine, 3,3'-dimethoxybenzidine-4,4'-diisocyanate, 1,3-phenylene diisocyanate, 1,4-phenylene diisocyanate, 4,4'-diisocyanatobiphenyl, 4,4'-diisocyanato-3,3'-dimethylbiphenyl, dicyclohexylmethane-4,4'-diisocyanate, 1,1'-methylenebis(4-isocyanatobenzene), 1,1'-methylenebis(3-methyl-4-isocyanatobenzene), m-xylylene diisocyanate, p-xylylene diisocyanate, 1,3-bis(1-isocyanate-1-methylethyl)benzene, 1,4-bis(1-isocyanate-1-methylethyl)benzene, 1,3-bis(2-isocyanato-2-propyl)benzene, 2,6-bis(isocyanatomethyl)tetrahydrodicyclopentadiene, bis(isocyanatomethyl)dicyclopentadiene, bis(isocyanatomethyl)tetrahydrothiophene, bis(isocyanatomethyl)thiophene, 2,5-diisocyanatemethylnorbornene, bis(isocyanatomethyl) adamantane, 3,4-diisocyanate selenophane, 2,6-diisocyanate-9-selenabicyclononane, bis(isocyanatomethyl) selenophane, 3,4-diisocyanate-2,5-diselenolane, dimer acid diisocyanate, 1,3,5-tri(1-isocyanatohexyl)isocyanurate, 2,5-diisocyanatomethyl-1,4-dithiane, 2,5-bis(isocyanatomethyl-4-isocyanato-2-thiabutyl)-1,4-dithiane, 2,5-bis(3-isocyanato-2-thiapropyl)-1,4-dithiane, 1,3,5-triisocyanatocyclohexane, 1,3,5-tris(isocyanatomethyl) cyclohexane, bis(isocyanatomethylthio)methane, 1,5-diisocyanate-2-isocyanatomethyl-3-thiapentane, 1,2,3-tris (isocyanatoethylthio)propane, 1,2,3-(isocyanatomethylthio) propane, 1,1,6,6-tetrakis(isocyanatomethyl)-2,5-dithiahexane, 1,1,5,5-tetrakis(isocyanatomethyl)-2,4-dithiapentane, 1,2-bis(isocyanatomethylthio)ethane, and 1,5-diisocyanate-3-isocyanatomethyl-2,4-dithiapentane. Other examples include dimers produced in the Biuret reaction of these polyisocyanates, cyclic trimers of these polyisocyanates, and addition products of these polyisocyanates with alcohol or thiol. Further examples include compounds obtained by converting some or all of the isocyanate groups of the polyisocyanates into isothiocyanate groups. These compounds may be used either individually or as a mixture of two or more compounds.

Examples of the thiol compounds used in the thiourethane-based polymerizable composition include monothiols, such as methylthiol, ethylthiol, n-propylthiol, n-butylthiol, allylthiol, n-hexylthiol, n-octylthiol, n-decylthiol, n-dodecylthiol, n-tetradecylthiol, n-hexadecylthiol, n-octadecylthiol, cyclohexylthiol, isopropylthiol, tert-butylthiol, tert-nonylthiol, tert-dodecylthiol, benzylthiol, 4-chlorobenzylthiol, methylthioglycolate, ethylthioglycolate, n-butylthioglycolate, n-octylthioglycolate, methyl(3-mercaptopropionate), ethyl(3-mercaptopropionate), 3-methoxybutyl(3-mercaptopropionate), n-butyl(3-mercaptopropionate), 2-ethylhexyl(3-mercaptopropionate), n-octyl(3-mercaptopropionate), 2-mercaptoethanol, 3-mercaptopropanol, 2-mercaptopropanol, 2-hydroxypropylthiol, 2-phenyl-2-mercaptoethanol, 2-phenyl-2-hydroxyethylthiol, 3-mercapto-1,2-propanediol, and 2-mercapto-1,3-propanediol; polythiols, such as methanedithiol, methanetrithiol, 1,2-dimercaptoethane, 1,2-dimercaptopropane, 2,2-dimercaptopropane, 1,3-dimercaptopropane, 1,2,3-trimercaptopropane, 1,4-dimercaptobutane, 1,6-dimercaptohexane, bis(2-mercaptoethyl)sulfide, bis(2,3-dimercaptopropyl)sulfide, 1,2-bis(2-mercaptoethylthio)ethane, 1,5-dimercapto-3-oxapentane, 1,8-dimercapto-3,6-dioxaoctane, 2,2-dimethylpropane-1,3-dithiol, 3,4-dimethoxybutane-1,2-dithiol, 2-mercaptomethyl-1,3-dimercaptopropane, 2-mercaptomethyl-1,4-dimercaptobutane, 2-(2-mercaptoethylthio)-1,3-dimercaptopropane, 1,2-bis(2-mercaptoethylthio)-3-mercaptopropane, 4-mercaptomethyl-1,8-dimercapto-3,6-dithiaoctane, 2,4-bis(mercaptomethyl)-1,5-dimercapto-3-thiapentane, 4,8-bis(mercaptomethyl)-1,11-dimercapto-3,6,9-trithiaundecane, 4,7-bis(mercaptomethyl)-1,11-dimercapto-3,6,9-trithiaundecane, 5,7-bis(mercaptomethyl)-1,11-dimercapto-3,6,9-trithiaundecane, 1,2,7-trimercapto-4,6-dithiaheptane, 1,2,9-trimercapto-4,6,8-trithianonane, 1,2,8,9-tetramercapto-4,6-dithianonane, 1,2,10,11-tetramercapto-4,6,8-trithiaundecane, 1,2,12,13-tetramercapto-4,6,8,10-tetrathiaundecane, 1,1,1-tris(mercaptomethyl)propane, tetrakis(mercaptomethyl)methane, tetrakis(4-mercapto-2-thiabutyl)methane, tetrakis(7-mercapto-2,5-dithiaheptyl)methane, ethylene glycol bis(2-mercaptoacetate), ethylene glycol bis(3-mercaptopropionate), 1,4-butanediol bis(2-mercaptoacetato), 1,4-butanediol bis(3-methylpropionate), trimethylolpropanetris(2-mercaptoacetato), trimethylolpropanetris(3-mercaptopropionate), pentaerythritol tetrakis(2-mercaptoacetate), pentaerythritol tetrakis(3-mercaptopropionate), pentaerythritol tetrakis(2-mercaptoacetate), 1,1-dimercaptocyclohexane, 1,4-dimercaptocyclohexane, 1,2-dimercaptocyclohexane, 1,4-bis(mercaptomethyl)cyclohexane, 1,3-bis(mercaptomethyl)cyclohexane, 2,5-bis(mercaptomethyl)-1,4-dithiane, 2,5-bis(2-mercaptoethyl)-1,4-dithiane, 2,5-bis(mercaptomethyl)-1-thiane, 2,5-bis(mercaptoethyl)-1-thiane, 1,4-bis(mercaptomethyl)benzene, 1,3-bis(mercaptomethyl)benzene, bis(4-mercaptophenyl)sulfide, bis(4-mercaptophenyl)ether, bis(4-mercaptomethylphenyl)methane, 2,2-bis(4-mercaptophenyl)propane, bis(4-mercaptomethylphenyl)sulfide, bis(4-mercaptomethylphenyl)ether, 2,2-bis(4-mercaptomethylphenyl)propane, 2,5-dimercapto-1,3,4-thiadiazole, 3,4-thiophenedithiol, 1,2-dimercapto-3-propanol, 3,4-thiophenedithiol, 1,2-dimercapto-3-propanol, 1,3-dimercapto-2-propanol, glyceryl thioglycolate, 1,1,2,2-tetrakis(mercaptomethylthio)ethane, 1,1,3,3-tetrakis(mercaptomethylthio)propane, and 3-mercaptomethyl-1,5-dimercapto-2,4-dithiapentane; and oligomers thereof, ranging from dimers to icosamers. Other examples include compounds obtained by converting some or all of the thiol groups of the polythiols into alcohol groups. Further examples include thiophenols, such as thiophenol, 4-tert-butylphenol, 2-methylthiophenol, 3-methylthiophenol, 4-methylthiophenol, 1,2-dimercaptobenzene, 1,3-dimercaptobenzene, 1,4-dimercaptobenzene, 2-hydroxythiophenol, 3-hydroxythiophenol and 4-hydroxythiophenol; thiols with unsaturated groups, such as allylthiol, 2-vinylbenzylthiol, 3-vinylbenzylthiol, and 4-vinylbenzylthiol; and thiophenols with unsaturated groups, such as 2-vinylthiophenol, 3-vinylthiophenol, and 4-vinylthiophenol. These thioalcohols may be used either individually or as a mixture of two or more.

Examples of the monomers for use in the episulfide-based polymerizable composition include ethylene sulfide, propylene sulfide, cyclohexene sulfide, styrene sulfide, thioglycidol, 1,1bis(epithioethyl)methane, tetrakis(β-epithiopropyl)methane, 1,1,1-tris(β-epithiopropyl)propane, 1,3- or 1,4-bis(epithioethyl)cyclohexane, 2,5-bis(epithioethyl)-1,4-dithiane, 4-epithioethyl-1,2-cyclohexene sulfide, 4-epoxy-1,2-cyclohexene sulfide, methylthioglycidyl ether, bis(β-epithiopropyl)ether, 1,2-bis(β-epithiopropyloxy)ethane, tetrakis(β-epithiopropyloxymethyl)methane, 1,1,1-tris(β-epithiopropyloxymethyl)propane, bis[4-(β-epithiopropyloxy)cyclohexyl]methane, 2,2-bis[4-(β-epithiopropyloxy)cyclohexyl]propane, bis[4-(β-epithiopropyloxy)cyclohexyl]sulfide, 2,5-bis(β-epithiopropyloxymethyl)-1,4-dithiane, 1,3- or 1,4-bis(β-epithiopropyloxy)benzene, 1,3- or 1,4-bis(β-epithiopropyloxymethyl)benzene, bis[4-(β-epithiopropyloxy)phenyl]methane, 2,2-bis[4-(β-epithiopropyloxy)phenyl]propane, bis[4-(β-epithiopropyloxy)phenyl]sulfide, bis[4-(β-epithiopropyloxy)phenyl]sulfone, 4,4'-bis(β-epithiopropyloxy)biphenyl, bis(β-epithiopropyl)sulfide, bis(β-epithiopropyl)disulfide, bis(β-epithiopropyl)trisulfide, bis(β-epithiopropylthio)methane, 1,2-bis(β-epithiopropylthio)ethane, 1,3-bis(β-epithiopropylthio)propane, 1,2-bis(β-epithiopropylthio)propane, 1,4-bis(β-epithiopropylthio)butane, 1,5-bis(β-epithiopropylthio)pentane, 1,6-bis(β-epithiopropylthio)hexane, bis(β-epithiopropylthioethyl)sulfide, tetrakis(β-epithiopropylthiomethyl)methane, 1,1,1-tris(β-epithiopropylthiomethyl)propane, 1,5-bis(β-epithiopropylthio)-2-(β-epithiopropylthiomethyl)-3-thiapentane, 1,5-bis(β-epithiopropylthio)-2,4-bis(β-epithiopropylthiomethyl)-3-thiapentane, 1,8-bis(β-epithiopropylthio)-4-(β-epithiopropylthiomethyl)-3,6-dithiaoctane, 1,8-bis(β-epithiopropylthio)-4,5-bis(β-epithiopropylthiomethyl)-3,6-dithiaoctane, 1,8-bis(β-epithiopropylthio)-4,4-bis(β-epithiopropylthiomethyl)-3,6-dithiaoctane, 1,8-bis(β-epithiopropylthio)-2,4,5-tris(β-epithiopropylthiomethyl)-3,6-dithiaoctane, 1,8-bis(β-epithiopropylthio)-2,5-bis(β-epithiopropylthiomethyl)-3,6-dithiaoctane, 1,9-bis(β-epithiopropylthio)-5-(β-epithiopropylthiomethyl)-5-[(2-β-epithiopropylthioethyl)thiomethyl]-3,7-dithianonane, 1,10-bis(β-epithiopropylthio)-5,6-bis [(2-β-epithiopropylthioethyl)thio]-3,6,9-trithiadecane, 1,11-bis(β-epithiopropylthio)-4,8-bis(β-epithiopropylthiomethyl)-3,6,9-trithiaundecane, 1,11-bis(β-epithiopropylthio)-5,7-bis(β-epithiopropylthiomethyl)-3,6,9-trithiaundecane, 1,11-bis(β-epithiopropylthio)-5,7-[(2-β-epithiopropylthioethyl)thiomethyl]-3,6,9-trithiaundecane, 1,11-bis(β-epithiopropylthio)-4,7-bis(β-epithiopropylthiomethyl)-3,6,9-trithiaundecane, 2,5-bis(epithiopropylthiomethyl)-1,4-dithiane, 2,4,6-tris(epithiopropylthiomethyl)-1,3,5-dithiane, 1,3- or 1,4-bis(β-epithiopropylthio)benzene, 1,3- or 1,4-bis(β-epithiopropylthiomethyl)benzene, bis[4-(β-epithiopropylthio)phenyl]methane, 2,2-bis[4-(β-epithiopropylthio)phenyl]propane, bis[4-(β-epithiopropylthio)phenyl]sulfide, bis[4-(β-epithiopropylthio)phenyl]sulfone, 4,4'-bis(β-epithiopropylthio)biphenyl, bis(β-epithiopropyl)selenide, bis(β-epithiopropyl)diselenide, bis(β-epithiopropyl)telluride, bis(β-epithiopropyl)ditelluride, vinylphenylthioglycidylether, vinylbenzylthioglycidylether, thioglycidyl methacrylate, thioglycidyl acrylate and allylthioglycidyl ether. Further examples include episulfide compounds obtained by substituting with methyl groups one or more hydrogen atoms of the thiirane ring of these compounds. Preferred examples of such compounds include bis(β-epithiopropyl)sulfide, bis(β-epithiopropyl)disulfide, bis(β-epithiopropyl)trisulfide, bis(β-epithiopropylthio)methane, 1,2-bis(β-epithiopropylthio)ethane, 1,3-bis(β-epithiopropylthio)propane, 1,4-bis(β-epithiopropylthio)butane, 1,5-bis(β-epithiopropylthio)pentane, 1,6-bis(β-epithiopropylthio)hexane, and bis(β-epithiopropylthioethyl)sulfide.

Preferably, the monomer for use in the CR-39-based polymerizable composition is an allyl derivative such as an allyl carbonate of aliphatic or aromatic polyols. (Note that polymer in the composition may include co-polymer and the composition may be mixture of various types of polymer.) While diethylene glycol bis(allyl carbonate) (CR-39) is the most common allyl carbonate, other allyl carbonates are also used, including ethylene glycol bis(allyl carbonate), diethylene glycol bis(2-methylallyl carbonate), ethylene glycol bis(2-chloroallyl carbonate), triethylene glycol bis(allyl carbonate), 1,3-propanediol bis(allyl carbonate), propylene glycol bis(2-ethylallyl carbonate), 1,3-butenediol bis(allyl carbonate), 1,4'-butenediol bis(2-bromoallyl carbonate), dipropylene glycol bis(allyl carbonate), trimethylene glycol bis(2-ethylallyl carbonate), pentamethylene glycol bis(allyl carbonate) and isopropylene bisphenol A bis(allyl carbonate). These allyl carbonates may be used either individually or in combination of two or more compounds.

Coated Sheet-Like Light Control Element

A coated sheet-like light control element according to the second aspect of the present invention is intended for use in the production of a light control plastic lens that comprises a sheet-like light control element having at least a light control sheet. The coated sheet-like light control element comprises the sheet-like light control element and a curable polymerizable composition film laminated on at least one surface of the sheet-like light control element.

The coated sheet-like light control element of the present invention can be readily manufactured: a common light control laminate may be coated, or a precoated transparent sheet (coated transparent sheet) may be laminated onto a light control sheet. Such a coated sheet-like light control element can be subjected to the cast polymerization process to make a light control plastic lens of the present invention and therefore serve as a useful intermediate in the production of the light control plastic lens of the present invention.

The light control sheet and the sheet-like light control element play the same roles in the coated sheet-like light control element as do their counterparts in the light control plastic lens according to the first aspect of the present invention. The term "curable polymerizable composition" in the coated sheet-like light control element means a polymerizable composition that serves as a precursor to the curable resin in the light control plastic lens of the first aspect of the present invention that is converted upon exposure to external energy such as heat and UV rays.

The light control sheet in the coated sheet-like light control element is preferably a polarizing sheet, a photochromic sheet, or a polarizing/photochromic sheet.

Figure 3:
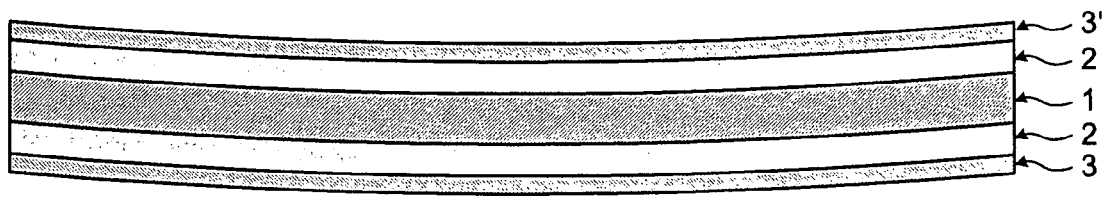
FIG. 3 is a schematic diagram showing one example of a coated sheet-like light control element for use in the light control plastic lens of the present invention.

One example of the coated sheet-like light control element is schematically shown in FIG. 3, in which the sheet-like light control element is a light control laminate. The laminate includes a light control sheet 1, a transparent sheet 2, and a (meth)acrylate-based resin composition film 3' but not a polymerizable lens resin layer 4 such as that shown in FIG. 1.

The curable resin layer formed by curing the curable polimerizable composition film preferably has a thickness of 0.1 μm to 20 μm, preferably 2 μm to 13 μm. When the thickness of the curable resin layer is less than 0.1 μm, the resistance against the polymerizable composition and adhesion may deteriorate, whereas crack or the like may occur during bending process when it is more than 20 μm.

The (meth)acrylate-based resin may be any type of (meth)acrylate-based resin. In view of curing time and safety, the (meth)acrylate-based polymerizable composition preferably has an ability to cure upon exposure to an active energy ray. A preferred active ray is UV ray. The (meth)acrylate-based resin may preferably be one selected from the group consisting of urethane(meth)acrylate resins, polyester(meth)acrylate resins, and epoxy(meth)acrylate resins in view of UV curability.

The (meth)acrylate-based polymerizable composition is the same as the (meth)acrylate-based polymerizable composition described above with reference to the light control plastic lens according to the first aspect of the invention and the foregoing description can thus be applied.

One specific example of the coated sheet-like light control element of the present invention includes a commonly used laminate comprising a polarizing sheet or a photochromic sheet sandwiched between triacetyl cellulose layers and the curable polymerizable composition film laminated on at least one surface of the laminate.

Another example of the coated sheet-like light control element employs a laminate made by sandwiching a prefabricated polarizing sheet or a photochromic sheet between optical transparent resin films of an alicyclic polyolefin resin such as ARTON, ZEONOR, and APEL. A film of the curable polymerizable composition is laminated on at least one surface of the laminate.

A coated transparent sheet of the present invention is intended for the production of a light control plastic lens that comprises a sheet-like light control element having at least a light control sheet. The coated transparent sheet comprises a transparent sheet and a curable polymerizable composition film coated on at least one surface of the transparent sheet.

Such a coated transparent sheet can be laminated on the light control sheet to make a coated sheet-like light control element, which in turn is subjected to the cast polymerization process to make a light control plastic lens of the present invention. Thus, the coated transparent sheet can serve as a useful intermediate product in the production of the light control plastic lens of the present invention.

The sheet-like light control element play the same roles in the coated transparent sheet as does its counterpart in the light control plastic lens according to the first aspect of the present invention. The term "curable polymerizable composition" in the coated transparent sheet means a polymerizable composition that serves as a precursor to the curable resin in the light control plastic lens of the first aspect of the present invention that is converted upon exposure to external energy such as heat and UV rays. The foregoing description of the transparent sheet of the light control plastic lens according to the first aspect of the present invention also applies to the coated transparent sheet.

As depicted in FIGS. 1 and 3, the coated transparent sheet is a laminate consisting of a transparent sheet 2 and a (meth)acrylate-based resin layer 3 as curable resin layer or (meth)acrylate-based resin composition film 3' as curable polymerizable composition film.

The coated sheet-like light control element can be obtained by simply attaching this coated transparent sheet to a traditional light control sheet such as a polarizing sheet or a photochromic sheet. Thus, the coated transparent sheet of the present invention is of significant usefulness.

The curable resin layer preferably has a thickness of 0.1 µm to 20 µm, preferably 2 µm to 13 µm. The curable resin layer thinner than 0.1 µm tends to have a reduced resistance and decreased adhesion to the polymerizable composition, whereas the curable resin layer thicker than 20 µm is susceptible to cracking and other problems during bending.

The (meth)acrylate-based resin may be any type of (meth)acrylate-based resin. In terms of curing time and safety, the (meth)acrylate-based polymerizable composition preferably has an ability to cure upon exposure to an active energy ray. A preferred active ray is UV ray. The (meth)acrylate-based resin may preferably be one selected from the group consisting of urethane(meth)acrylate resins, polyester(meth)acrylate resins, and epoxy(meth)acrylate resins in view of UV curability.

The (meth)acrylate-based polymerizable composition is the same as the (meth)acrylate-based polymerizable composition described above with reference to the light control plastic lens according to the first aspect of the invention and the foregoing description can thus be applied.

Production Method for Light Control Plastic Lens

A production method according to the third aspect of the present invention is intended to produce a light control plastic lens comprising a sheet-like light control element having at least a light control sheet. The method comprises at least a coating step of coating at least one surface of a sheet-like light control element with a curable polymerizable composition; a curing step of curing the curable polymerizable composition film coated on the sheet-like light control element to form a curable resin layer; and a cast polymerization step in which the sheet-like light control element laminated with the curable resin layer is embedded in a polymerizable lens composition within a mold and the polymerizable lens composition is polymerized.

The curable polymerizable composition is applied to at least one surface of the sheet-like light control element because the coat layer is highly resistant to, and shows high adhesion to, various polymerizable lens compositions. The production method according to the present invention allows the use of a wide range of polymerizable lens compositions, facilitates the bending process and maintenance of the lens compositions before and after the process, and enables efficient production of high index light control plastic lenses by the cast polymerization technique.

In the production method of the light control plastic lens according to the present invention, the coated sheet-like light control element can be made by preparing the coated transparent sheet by coating one surface of the transparent sheet with the curable polymerizable composition, and adhering the coated transparent sheet to at least one surface of the light control sheet.

The use of the coated transparent sheet according to the present invention makes it possible to make the coated sheet-like light control element by simply attaching the coated transparent sheet to at least one surface of the light control sheet. This facilitates the production of the coated sheet-like light control element.

In the production method of the light control plastic lens according to the present invention, the coated sheet-like light control element can also be made by preparing the sheet-like light control element (including light control laminate) by adhering the transparent sheet to at least one surface of the light control sheet, and applying the curable polymerizable composition over the transparent sheet.

The light control sheet used in the coated sheet-like light control element is preferably a polarizing sheet, a photochromic sheet or a polarizing/photochromic sheet.

The light control sheet and the sheet-like light control element play the same roles in the production method of the light control plastic lens according to the present invention as do their counterparts in the light control plastic lens according to the first aspect of the present invention. The term "curable polymerizable composition" in the coated sheet-like light control element means a polymerizable composition that serves as a precursor to the curable resin used in the light control plastic lens of the first aspect of the present invention that is converted upon exposure to external energy such as heat and UV rays.

The curable polymerizable composition may be applied to the transparent sheet after the formation of the light control laminate, or, alternatively, the transparent sheet precoated with the curable polymerizable composition (i.e., the coated transparent sheet of the present invention) may be laminated on the sheet-like light control element to form the coated sheet-like light control element of the invention. The coated sheet-like light control element includes the coated light control laminate. In each case, the (meth)acrylate polymerizable composition can be applied to the transparent sheet by any of commonly used techniques, including spin coating, dipping, flow coating, roll coater technique, and curtain coat technique.

The film thickness of the curable polymerizable composition is preferably in the range of 0.1 µm to 20 µm. The curable resin layer thinner than 0.1 µm tends to have a reduced resistance and decreased adhesion to the polymerizable composition, whereas the curable resin layer thicker than 20 µm is susceptible to cracking and other problems during bending.

The (meth)acrylate-based resin may be any type of (meth)acrylate-based resin. In terms of curing time and safety, the (meth)acrylate-based polymerizable composition preferably has an ability to cure upon exposure to an active energy ray. A preferred active ray is UV ray. The (meth)acrylate-based resin may preferably be one selected from the group consisting of urethane(meth)acrylate resins, polyester(meth)acrylate resins, and epoxy(meth)acrylate resins in view of UV curability.

The (meth)acrylate-based polymerizable composition is the same as the (meth)acrylate-based polymerizable composition described above with reference to the light control plastic lens according to the first aspect of the invention and the foregoing description can thus be applied.

The film of the curable polymerizable composition laminated on the transparent sheet can be cured by exposure to UV rays and other active energy rays to form a curable polymerizable resin layer.

In view of curing time and safety, the curable polymerizable composition preferably has an ability to cure upon exposure to an active energy ray. A preferred active ray is UV ray.

The production process may further include a bending step that involves bending the sheet-like light control element, laminated with the curable resin layer in the curing step, into a lens shape. The resulting bent product is coated with a material for a lens substrate in the subsequent cast polymerization step. This completes the light control plastic lens. The light control plastic lens can also be produced by laminating the bent product with the polymerizable lens resin.

Once cured, the coated sheet-like light control element laminated with the curable polymerizable resin layer may be directly subjected to the subsequent cast polymerization process. In general, however, lens disks of desired shape, such as circular, elliptic, or rectangular disks, are stamped out of the coated sheet-like light control element and are vacuum-molded into lens-shaped bent products, which are then subjected to the cast polymerization.

As an embodiment of "cast polymerization" includes a polymerization technique in which the cured coated sheet-like light control element is mounted within a mold and the polymerizable lens composition is poured into the mold and is then allowed to polymerize.

The polymerizable lens composition and the cured coated sheet-like light control element can be integrated with one another using a common cast polymerization technique. Specifically, a mold designed for cast polymerization, such as a glass mold, that has a structure that allows the polymerizable lens composition to be injected at least from above or below the cured coated sheet-like light control element is used. The polymerization may be carried out under conditions suitable for the polymerizable lens composition used.

When the coated sheet-like light control element is coated with the layer of curable polymerizable resin on one surface, only the coated surface of the sheet-like light control element may be integrated with the polymerizable lens composition, or, alternatively, each of the coated surface and the exposed surface of the sheet-like light control element may be integrated with the polymerizable lens composition. When the coated sheet-like light control element is coated with the layer of curable polymerizable resin layer on each surface, both of the surfaces are generally integrated with the polymerizable lens composition, while only one surface may be integrated with the lens composition.

The mold for cast polymerization for use in the present invention may be a glass mold commonly used in the production of eyeglass lenses. In one specific cast polymerization process, the polymerizable lens composition is poured in a half of the mold and the coated sheet-like light control element is placed on the surface of the poured lens composition. The other half of the mold is then engaged with the first half via a gasket in a liquid-tight manner and additional polymerizable lens composition is poured into the mold. The polymerizable lens composition is then allowed to polymerize. In another specific process, the coated sheet-like light control element is held in place within the mold by a proper support and the polymerizable lens composition is poured into the mold for polymerization. In still another specific process, the coated sheet-like light control element is placed in a half of the mold so that it is in close contact with the mold. The polymerizable lens composition is then poured into the mold for polymerization.

The coated sheet-like light control element for use in the cast polymerization may be of any size and shape. Specifically, the coated sheet-like light control element may cover part or all of the final lens surface. The coated sheet-like light control element is preferably wetted with the monomer prior to placement in the mold. This prevents introduction of air bubbles and ensures adhesion of the curable resin, which results from the polymerization of the polymerizable lens composition, to the coated sheet-like light control element. In some cases, the polymerizable lens composition contains a polymerization initiator so that polymerization is initiated when the composition is heated to a proper temperature.

In the production method of the light control plastic lens according to the present invention, the coated sheet-like light control element that has at least one surface coated with the curable polymerizable composition can be used in conjunction with a wide range of polymerizable compositions for lens substrate to form a lens. Conveniently, almost every commercial polymerizable composition product for lens substrate can be directly used as the polymerizable lens composition. A wide variety of polymerizable compositions can be used, not to be limited to CR-39. Preferred polymer compositions are those containing sulfur-containing polymerizable compounds, in particular, polymerizable compositions developed for high index lenses, such as thiourethane-based polymerizable compositions and episulfide-based polymerizable compositions.

The polymerizable lens composition is the same as the polymerizable lens composition described above with reference to the light control plastic lens according to the first aspect of the invention and the foregoing description can thus be applied.

EXAMPLES

The present invention will now be described with reference to Examples and Comparative Examples, which are not intended to limit the scope of the invention in any way.

Evaluation of Coated Transparent Sheets for Use in the Light Control Plastic Lens of the Present Invention Different coated transparent sheets and plastic photochromic lenses were made according to the present invention and were subjected to evaluation.

Performance of Plastic Polarizing Lenses of the Present Invention

Methods

The transmittance, degree of polarization, and coating thickness were measured for each of the plastic polarizing lenses made in Examples and Comparative Examples given below. The measurements were made according to the methods described below.

(A) Transmittance

The transmittance was determined using a spectrophotometer (JASCO Co., Ltd.).

(B) Degree of Polarization

The degree of polarization (P) was determined based on the following equation:

$$P = \sqrt{\frac{H_0 - H_{90}}{H_0 + H_{90}}} \times 100$$

In the equation above, the degree of polarization (P) is defined as a mean value obtained after luminosity correction in the visible range of 400 nm to 700 nm. $H_o$ indicates the parallel transmittance, which is defined as the transmittance of two polarizers arranged with their molecular orientation axes parallel to one another, and $H_{90}$ indicates the cross transmittance, which is defined as the transmittance of two polarizers arranged with their molecular orientation axes perpendicular to one another.

(C) Coating Thickness

The thickness of the coating was determined using a multi-layered film thickness gauge DC-8200 (Gunze Co., Ltd.).

Examples 1 through 3

In each example, a plastic polarizing lens was produced in accordance with the present invention and its performance was evaluated. The polarizing lens included a polarizing film substrate (1) to serve as the polarizing sheet of the present invention; a polycarbonate sheet (2) to serve as the transparent sheet; a (meth)acrylate-based polymerizable composition (4) to serve as the curable polymerizable composition; and one of a thiourethane-based polymerizable composition (5) (Example 1), an episulfide-based polymerizable composition (6) (Example 2), and CR-39 (7) (Example 3), each to serve as the polymerizable lens composition.

Example 1

(a) Production of the Polarizing Sheet Substrate (1) (to Serve as the Polarizing Sheet of the Present Invention)

A polyvinyl alcohol film (Product name, KURARAY VINYLON #750, manufactured by Kuraray Co., Ltd.) was stained in an aqueous solution containing 0.25 g/L of Chlorantine Fast Red (C.I. 28160), 0.18 g/L of Chrysophenine (C.I. 24895), 1.0 g/L of Solophenyl Blue 4GL (C.I. 34200), and 10 g/L of sodium sulfate at 35° C. for 3 minutes. The stained sheet was then stretched to 4-folds its original length in the solution. Subsequently, the stained sheet was immersed in an aqueous solution containing 2.5 g/L of nickel acetate and 6.6 g/L of boric acid for 35° C. for 3 minutes. While strained, the sheet was dried at room temperature for 3 minutes and was then heated at 70° C. for 3 minutes to obtain a polarizing sheet substrate (1).

The resulting polarizing sheet showed the following optical characteristics: Transmittance obtained after luminosity correction in the entire visible range T (vis.)=19.3%, and Degree of Polarization P=99.8%. The film substrate contained 1.2 mg/g nickel and 1.3 mg/g boron. The thickness of the polarizing sheet was 31 μm.

(b) Transparent Sheet of the Present Invention

A 300 μm thick polycarbonate sheet (2) (having a retardation value of 4,800, manufactured by Mitsubishi Gas Chemical Co., Ltd.) was used to serve as the transparent sheet.

(c) Adhesive Composition (3)

An adhesive composition (3) was prepared by using 25 parts by weight of diphenylmethane-4,4'-diisocyanate and 600 parts by weight of ethyl acetate as a solvent relative to 100 parts by weight of polypropylene glycol (M=900).

(d) (Meth)Acrylate-Based Polymerizable Composition (4)

A (meth)acrylate-based polymerizable composition (4) was prepared by using 60 parts by weight of 1,9-nonanediol acrylate (Product name Biscoat #215, manufactured by Osaka Organic Chemical Industry Ltd.), 37 parts by weight of a polyfunctional urethane acrylate oligomer (Product name, U-4HA, manufactured by Shin-Nakamura Chemical Co., Ltd.), and 3 parts by weight of 2-hydroxy-2-methyl-1-phenyl-propane-1-one (Product name, DAROCUR 1173, manufactured by Ciba Specialty Chemicals).

(e) Production of Coated Polarizing Laminate

Using a #24 bar coater, the adhesive composition (3) was applied to one surface of the polarizing film substrate (1) obtained in (a) above and was dried at room temperature for 5 minutes. This surface was then laminated with the polycarbonate sheet (2) under a nip pressure of 4.0 kg/cm²G using a laminator (manufactured by Mitsushiba Shoji Co., Ltd.). Similarly, the other surface of the film substrate was laminated with the polycarbonate sheet.

Using a #24 bar coater, the (meth)acrylate-based polymerizable composition (4) was applied to one surface of the resulting laminate to serve as an outermost layer, which was then covered with a 50 μm polyethylene film (manufactured by Toray Synthetic Film Co., Ltd.). A UV-ray was then irradiated onto the polyethylene film at 2200 mJ/cm². The other surface of the laminate was treated in a similar manner to obtain a coated sheet-like polarizing element of the present invention coated with the (meth)acrylate-based composition.

The coating on each surface was determined to be 5 to 7 μm thick after curing.

(f) Production of Plastic Polarizing Lens by Cast Polymerization (f-1) Bending of the Coated Sheet-Like Polarizing Element A disk was stamped out of the coated sheet-like polarizing element obtained in (e) above and was vacuum-molded at 140° C. in a 3 mmHg atmosphere for 5 minutes into a lens-shaped bent product with a curvature R of 87.2 mm.

(f-2) Cast Polymerization (f-2-1) Cast Polymerization Using Thiourethane-Based Polymerizable Composition (5)

The resulting bent product was trimmed to a diameter of 60 mm and was placed in a spherical glass mold, also 60 mm in diameter. A thiourethane-based polymerizable composition, composed of 39.55 parts by weight of pentaerythritol tetrakis(3-mercaptopropionate), 30.45 parts by weight of m-xylylene diisocyanate, and 0.035 parts by weight of dibutyltin dilaurate, was injected into the spaces defined within the mold above and below the bent product. The mold was heated from 30° C. to 100° C. at a rate of 3.5° C./hour and, subsequently, from 100° C. to 120° C. at a rate of 20° C./hour and was maintained at 120° C. for 3 hours to allow the composition to polymerize.

This resulted in a plastic polarizing lens that had a good transparency and comprised the coated sheet-like polarizing element and the thiourethane-based resin lens substrate firmly integrated together. No significant color change was visually observed in the resulting lens as compared to the polarizing film substrate prior to the polymerization, nor was any significant difference detected by the spectrophotometry analysis of the polarizing properties of the lens before and after the polymerization (T(vis.)=19.9% and P=99.9%, Table 1).

Example 2

(f-2-2) Cast Polymerization Using Episulfide-Based Polymerizable Composition (6)

As the polymerizable lens composition, an episulfide-based polymerizable composition (6) was prepared by mixing 95 parts by weight of bis(β-epithiopropyl)sulfide, 5 parts by weight of bis(2-mercaptoethyl)sulfide, and 0.05 parts by weight of tetra-n-butylphosphonium bromide.

Polymerization was carried out in exactly the same manner as in (f-2-1), except that the temperature was raised from 20° C. to 100° C. at a rate of 4° C./hour and subsequently from 100° C. to 120° C. at a rate of 20° C./hour and was then maintained at 120° C. for 3 hours.

Again, a high quality plastic polarizing lens was obtained with no significant change in the polarizing properties observed before and after the polymerization (T (vis.)= 19.8% and P=99.8%, Table 1).

Example 3

(f-2-3) Cast Polymerization Using CR-39 (7)

As the polymerizable lens composition, CR-39 (7) was prepared by mixing 150 parts by weight of diethylene glycol bis(allyl carbonate) and 5 parts by weight of diisopropyl peroxycarbonate.

Polymerization was carried out in exactly the same manner as in (f-2-1), except that the temperature was initially maintained at 30° C. for 10 hours, was raised from 30° C. to 100° C. at a rate of 7° C./hour, and was subsequently maintained at 100° C. for 1 hour.

Again, a high quality plastic polarizing lens was obtained with no significant change in the polarizing properties observed before and after the polymerization (T (vis.)= 19.5% and P=99.8%, Table 1).

Each of the lenses had favorable optical characteristics as shown in Table 1 below.

TABLE 1

| Polarizing Property | Example 1 Thiourethane-based | Example 2 Episulfide-based | Example 3 CR-39 |
|---|---|---|---|
| T(vis, %) | 19.9 | 19.8 | 19.5 |
| P(%) | 99.9 | 99.8 | 99.8 |

Examples 4 through 6

As the (meth)acrylate-based composition, a (meth)acrylate-based polymerizable composition (8) was prepared by mixing 60 parts by weight of 1,9-nonanediol dimethacrylate (Product name, NK ester NOD-N, manufactured by Shin-Nakamura Chemical Co., Ltd.), 40 parts by weight of a polyfunctional urethane acrylate oligomer (Product name, U-4HA, manufactured by Shin-Nakamura Chemical Co., Ltd.), and 3 parts by weight of 2-hydroxy-2-methyl-1-phenyl-propane-1-one (Product name, DAROCUR 1173, a polymerization initiator manufactured by Ciba Specialty Chemicals).

The rest of the processes of Examples 4 through 6 was carried out in exactly the same manner as in Examples 1 through 3, respectively. The outermost coating layer of each of the resulting polarizing laminates was 6 to 9 µm thick.

A high quality plastic polarizing lens was obtained in each combination of the (meth)acrylate-based polymerizable composition and one of the respective polymerizable lens compositions. Each of the lenses of Examples 4 through 6 had favorable optical characteristics as shown in Table 2 below.

TABLE 2

| Polarizing Property | Example 4 Thiourethane-based | Example 5 Episulfide-based | Example 6 CR-39 |
|---|---|---|---|
| T(vis, %) | 19.6 | 19.7 | 19.7 |
| P(%) | 99.6 | 99.8 | 99.6 |

Examples 7 through 9

A (meth)acrylate-based polymerizable composition (9) was prepared by mixing 48 parts by weight of a PO-modified neopentyl glycol diacrylate (Product name, PHOTOMER 4127-SN, manufactured by San Nopco Ltd.), 49 parts by weight of a trifunctional urethane acrylate oligomer (Product name, EBECRYL 264, manufactured by DAICEL-UCB Co., Ltd.), and 3 parts by weight of benzophenone (a polymerization initiator manufactured by Wako Pure Chemical Industries, Ltd.).

The rest of the processes of Examples 7 through 9 were carried out in exactly the same manner as in Examples 1 through 3, respectively. The outermost coating layer of each of the resulting polarizing laminates was 4 to 6 µm thick.

A high quality plastic polarizing lens was obtained in each combination of the acrylate-based polymerizable composition and one of the respective polymerizable lens compositions. Each of the lenses of Examples 7 through 9 had favorable optical characteristics as shown in Table 3 below.

TABLE 3

| Polarizing Property | Example 7 Thiourethane-based | Example 8 Episulfide-based | Example 9 CR-39 |
|---|---|---|---|
| T(vis, %) | 19.7 | 19.8 | 19.7 |
| P(%) | 99.6 | 99.7 | 99.7 |

Examples 10 through 12

The processes of Examples 10 through 12 were carried out in exactly the same manner as in Examples 1 through 3, respectively, except that a urethane acrylate-based coating UT-001 (10) (manufactured by Nippon Bee Chemical Co., Ltd.) was used as the acrylate-based polymerizable composition. The outermost coating layer of each of the resulting polarizing laminates was 6 to 8 µm thick.

A high quality plastic polarizing lens was obtained in each combination of the urethane acrylate-based coating and one of the respective polymerizable lens compositions. Each of the lenses of Examples 10 through 12 had favorable optical characteristics as shown in Table 4 below.

TABLE 4

| Polarizing Property | Example 10 Thiourethane-based | Example 11 Episulfide-based | Example 12 CR-39 |
|---|---|---|---|
| T(vis, %) | 19.8 | 19.8 | 19.7 |
| P(%) | 99.7 | 99.8 | 99.7 |

Examples 13 through 15

A (meth)acrylate-based polymerizable composition (11) was prepared by mixing 45 parts by weight of a PO-modified neopentyl glycol diacrylate (Product name, PHOTOMER 4127-SN, manufactured by San Nopco Ltd.), 30 parts by weight of a tetrafunctional polyester acrylate oligomer (Product name, EBECRYL 80, manufactured by DAICEL-UCB Co., Ltd.), 20 parts by weight of a trifunctional urethane acrylate oligomer (Product name, EBECRYL 264, manufactured by DAICEL-UCB Co., Ltd.), and 5 parts by weight of benzophenone (a polymerization initiator manufactured by Wako Pure Chemical Industries, Ltd.).

The rest of the processes of Examples 13 through 15 were carried out in exactly the same manner as in Examples 1 through 3, respectively. The outermost coating layer of each of the resulting polarizing laminates was 7 to 9 µm thick.

A high quality plastic polarizing lens was obtained in each combination of the (meth)acrylate-based polymerizable composition and one of the respective polymerizable lens compositions. Each of the lenses of Examples 13 through 15 had favorable optical characteristics as shown in Table 5 below.

TABLE 5

| Polarizing Property | Example 13 Thiourethane-based | Example 14 Episulfide-based | Example 15 CR-39 |
|---|---|---|---|
| T(vis, %) | 19.6 | 19.7 | 19.8 |
| P(%) | 99.8 | 99.8 | 99.8 |

Examples 16 and 17

As the (meth)acrylate-based composition, a (meth)acrylate-based polymerizable composition (12) was prepared by mixing 70 parts by weight of 1,9-nonanediol dimethacrylate (Product name, NK ester NOD-N, manufactured by Shin-Nakamura Chemical Co., Ltd.), 30 parts by weight of bisphenol A-type epoxy acrylate (Product name, NK oligomer EA-1020, manufactured by Shin-Nakamura Chemical Co., Ltd.), and 3 parts by weight of 2-hydroxy-2-methyl-1-phenyl-propane-1-one (Product name, DAROCUR 1173, a polymerization initiator manufactured by Ciba Specialty Chemicals).

The rest of the processes of Examples 16 and 17 were carried out in exactly the same manner as in Examples 1 and 3, respectively. The outermost coating layer of each of the resulting polarizing laminates was 6 to 9 µm thick.

A high quality plastic polarizing lens was obtained in each combination of the (meth)acrylate-based polymerizable composition and one of the respective polymerizable lens compositions. Each of the lenses of Examples 16 and 17 had favorable optical characteristics as shown in Table 6 below.

TABLE 6

| Polarizing Property | Example 16 Thiourethane-based | Example 17 CR-39 |
|---|---|---|
| T(vis, %) | 19.6 | 19.8 |
| P(%) | 99.7 | 99.6 |

Example 18

One surface of the polarizing film substrate obtain in Example 1 was laminated with the polycarbonate sheet in the same manner as in Example 1. The (meth)acrylate-based polymerizable composition was applied to the surface of the polycarbonate of the laminate in the same manner as in Example 1 to obtain a one-side coated sheet-like polarizing element.

The coated sheet-like polarizing element was then subjected to the same process as described in (f-2-1) of Example 1, including bending and polymerization, to obtain a thiourethane-based resin plastic polarizing lens. The lens was bent with the PC-laminated surface on the convex side.

Also in this case, a plastic polarizing lens was obtained that had a good transparency and in which the coated sheet-like polarizing element and the lens substrate are firmly integrated together. No significant color change was visually observed in the resulting plastic polarizing lens as compared to the polarizing film substrate prior to the polymerization, nor was any significant difference detected by the spectrophotometry analysis of the polarizing properties of the lens before and after the polymerization (T(vis.)=19.7% and P=99.8%).

Example 19

A thiourethane resin-based lens was made in the same manner as described in (f-2-1) of Example 1, except that OKP 4 film (13), a fluorene-based polyester resin film (obtained by pressing the resin at 280° C. into an approx. 200 µm sheet, Osaka Gas Chemicals Co., Ltd.), was used as the transparent sheet. The resulting plastic polarizing lens showed no significant change in the polarizing properties of the lens before and after the polymerization (T(vis.)=19.8% and P=99.8%).

Example 20

An episulfide resin-based lens was made in the same manner as in Example 2, except that an 80 µm thick TAC film (14) (manufactured by Konica Minolta Co., Ltd.) was used as the transparent sheet and the bending was performed at a temperature of 95° C. The resulting lens showed no significant change in the polarizing properties of the lens before and after the polymerization (T(vis.)=19.7% and P=99.8%).

Example 21

Using a 200 µm APEL film (15) (Product name, APL 6509T, manufactured by Mitsui Chemicals Co., Ltd.), the process was carried out in the same manner as in Example 18. A thiourethane resin-based lens was made in the same manner as in Example 1, except that the bending was carried out at a temperature of 80° C. The resulting plastic polarizing lens showed no significant change in the polarizing properties of the lens before and after the polymerization (T(vis.)=19.9% and P=99.8%).

Comparative Example 1

A polarizing laminated was made in the same manner as in Example 1.

Without surface-coating, the laminate was bent in the same manner as described in (f-1) of Example 1. An attempt was then made to form an episulfide resin-based lens in the same manner as described in (f-2-2) of Example 1.

The resultant lens was opaque due to the damaged surface of the laminate, however.

Comparative Example 2

The same process as in Example 20 was carried out without surface-coating of TAC. An attempt was made to form an episulfide resin-based lens in the same manner as described in (f-2-2) of Example 1.

The polymerizable resin to serve as the lens substrate did not adhere to the TAC sheet film, however.

Comparative Example 3

The same process as in Example 21 was carried out without surface-coating of APEL. An attempt was made to form an thiourethane resin-based lens in the same manner as described in (f-2-1) of Example 1.

The polymerizable resin to serve as the lens substrate did not adhere to APEL, however.

Comparative Example 4

The same process as in Example 19 was carried out without surface-coating of OKP 4.

The resultant lens was opaque due to the damaged surface of the laminate, however.

Performance of Plastic Polarizing Lenses of the Present Invention

Methods

The appearance, transmittance, darkening time, and fading time were measured for each of the plastic photochromic lenses made in Examples and Comparative Examples given below. The measurements were made according to the methods described below.

Appearance

The appearance of each plastic photochromic lens was visually observed.

Transmittance

Each sample lens was placed in a thermostat chamber adjusted to 23° C. Using a xenon lamp (SUPERCURE-203S, manufactured by San-Ei Electric Co., Ltd.), the lens was irradiated with light adjusted to a surface illuminance of 25 W/m$^2$ (Cumulative dose over 315 nm to 400 nm wavelengths) Using a spectrophotometer V-550 (JASCO Co., Ltd.), the average transmittance of each sample to visible light was determined with no irradiation (T1) and after a 7-minute irradiation period (T2).

The Darkening Time and the Fading Time

Assuming T1 to be the minimum transmittance of the non-irradiated lens to the visible light range and T2 to be the transmittance of the irradiated lens to the same wavelength that gave the minimum transmittance, the darkening time and the fading time can be defined based on a curve that shows the change in transmittance over time, as follows:

Darkening time=the time that it takes for the transmittance of a lens to shift from T1 to (T1+T2)/2; and Fading time=the time that it takes for the transmittance of a lens to shift from T2 to (T1+T2)/2.

Examples 22 through 24

(g) Production of a Polymerizable Composition (16) Containing a Photochromic Compound (to Serve as the Material of the Photochromic Sheet of the Present Invention)

15 g of a polyurethane prepolymer, which was obtained by the reaction of diphenyl methane-4,4'-diisocyanate with a polypropylene glycol having an average degree of polymerization of 15 and which had an NCO equivalent weight of 1500 (equivalent weight is defined as the average molecular weight per one functional group), was dissolved in 13.58 g of an organic solvent (4.636 g toluene, 1.745 g methyl ethyl ketone, and 7.2 g ethyl acetate). To this solution, 0.075 g of 4-[4-[6-(4-morpholinyl)-3-phenyl-3H-naphtho(2,1-b) pyran-3-yl]phenyl]-morpholine (Product name, Reversacol Flame, manufactured by James Robinson Ltd.) to serve as a photochromic compound, 0.453 g of bis(1,2,2,6,6-pentamethyl-4-piperidyl)sebacate as an additive, and 0.227 g of 3,9-bis[1,1-di-methyl-2-[β-(3-t-butyl-4-hydroxy-5-methylphenyl)propionyloxy]ethyl]-2,4,8,10-tetraoxaspiro[5,5] undecane were added and the mixture was mixed until uniform. Subsequently, 1.6 g of a curing agent (Product name, BHS6020C, manufactured by Toyo morton Ltd.), which was obtained by the reaction of trilene diisocyanate with polypropylene glycol and had an OH equivalent weight of 630, was added to the solution and the mixture was further stirred. This gave a photochromic polymerizable composition (16).

(h) Transparent Sheet for Use in the Present Invention

A 300 μm thick polycarbonate sheet (2) (Product name, Iupilon, manufactured by Mitsubishi Gas Chemical Co., Ltd.) was used as the transparent sheet.

(i) (Meth)Acrylate-Based Polymerizable Composition (4)

A (meth)acrylate-based polymerizable composition (4) was prepared by using 60 parts by weight of 1,9-nonanediol acrylate (Product name Biscoat #215, manufactured by Osaka Organic Chemical Industry Ltd.), 37 parts by weight of a polyfunctional urethane acrylate oligomer (Product name, U-4HA, manufactured by Shin-Nakamura Chemical Co., Ltd.), and 3 parts by weight of 2-hydroxy-2-methyl-1-phenyl-propane-1-one (Product name, DAROCUR 1173, manufactured by Ciba Specialty Chemicals).

(j) Production of Sheet-Like Photochromic Element Coated with (meth)Acrylate-Based Composition Using a doctor blade with a 200 μm clearance (Yoshimitsu Seiki Co., Ltd.), the photochromic polymerizable composition (16) obtained in (g) above was applied to the transparent sheet (2) obtained in (h). The coated sheet was then placed in a hot air dryer at 60° C. for 10 minutes to evaporate the solvent. The resulting coating layer was overlaid with another transparent sheet (2) and the polymerizable composition was cured by heating at 70° C. for 2 days. This gave a photochromic laminate consisting of two transparent sheets and a photochromic compound-containing thermosetting polyurethane resin layer (photochromic sheet) interposed between the transparent sheets. The thickness of the photochromic sheet except the polycarbonate sheet was 82 μm.

Using a #24 bar coater, the (meth)acrylate-based polymerizable composition (4) was applied to one surface of the resulting photochromic laminate to serve as an outermost layer, which was then covered with a 50 μm polyethylene film (manufactured by Toray Synthetic Film Co., Ltd.). A UV-ray was then irradiated onto the polyethylene film at 2200 mJ/cm$^2$. The other surface of the laminate was treated in a similar manner to obtain a cured coated sheet-like photochromic element. The coating on each surface was determined to be 6 to 8 μm thick after curing.

(k) Production of Plastic Photochromic Lens by Cast Polymerization (k-1) Bending of the Coated Sheet-Like Photochromic Element A disk was stamped out of the coated sheet-like photochromic element obtained in (j) above and was vacuum-molded at 140° C. in a 3 mmHg atmosphere for 5 minutes into a lens-shaped bent product with a curvature R of 87.2 mm.

(k-2) Cast Polymerization (k-2-1) Cast Polymerization Using Thiourethane-Based Polymerizable Composition (5)

The resulting bent product was trimmed to a diameter of 60 mm and was placed in a spherical glass mold, also 60 mm in diameter. A polymerizable lens composition (5), composed of 39.55 parts by weight of pentaerythritol tetrakis (3-mercaptopropionate), 30.45 parts by weight of m-xylylene diisocyanate, and 0.035 parts by weight of dibutyltin dilaurate, was injected into the spaces defined within the mold above and below the bent product. The mold was heated from 30° C. to 100° C. at a rate of 3.5° C./hour and, subsequently, from 100° C. to 120° C. at a rate of 20° C./hour and was maintained at 120° C. for 3 hours to allow the composition to polymerize.

This resulted in a lens that had a good transparency and in which the coated sheet-like photochromic element and the lens substrate are firmly integrated together. No significant color change was visually observed in the resulting lens as compared to the sheet prior to the polymerization. The spectrophotometry analysis also revealed that the photochromic properties of the laminate (i.e., appearance, transmittance, contrast, and response time) were well preserved in the lens as shown in Table 7-1.

(k-2-2) Cast Polymerization Using Episulfide-Based Polymerizable Composition (6) (Example 23)

As the polymerizable lens composition, an episulfide-based polymerizable composition (6) was prepared by mixing 95 parts by weight of bis(β-epithiopropyl)sulfide, 5 parts by weight of bis(2-mercaptoethyl)sulfide, and 0.05 parts by weight of tetra-n-butylphosphonium bromide.

Polymerization was carried out in exactly the same manner as in (k-2-1), except that the temperature was raised from 20° C. to 100° C. at a rate of 4° C./hour and subsequently from 100° C. to 120° C. at a rate of 20° C./hour and was then maintained at 120° C. for 3 hours.

Again, a high quality lens was obtained with favorable photochromic properties as shown in Table 8.

(k-2-3) Cast Polymerization Using CR-39 (7) (Example 24)

As the polymerizable lens composition, CR-39 (7) was prepared by mixing 150 parts by weight of diethylene glycol bis(allyl carbonate) and 5 parts by weight of diisopropyl peroxycarbonate.

Polymerization was carried out in exactly the same manner as in (k-2-1), except that the temperature was initially maintained at 30° C. for 10 hours, was raised from 30° C. to 100° C. at a rate of 7° C./hour, and was subsequently maintained at 100° C. for 1 hour.

Also in this case, a high quality lens was obtained with favorable photochromic properties as shown in Table 7-1.

Examples 25 through 27

A (meth)acrylate-based polymerizable composition (8) (urethane acrylate-based composition 2) was prepared by using 60 parts by weight of 1,9-nonanediol dimethacrylate (Product name, NK ester NOD-N, manufactured by Shin-Nakamura Chemical Co., Ltd.), 40 parts by weight of a polyfunctional urethane acrylate oligomer (Product name, U-4HA, manufactured by Shin-Nakamura Chemical Co., Ltd.), and 3 parts by weight of 2-hydroxy-2-methyl-1-phenyl-propane-1-one (Product name, DAROCUR 1173, a polymerization initiator manufactured by Ciba Specialty Chemicals).

The rest of the processes of Examples 25 through 27 was carried out in exactly the same manner as in Examples 22 through 24, respectively: cast polymerization in Examples 25 through 27 was performed by using the thiourethane-based polymerizable composition, episulfide-based polymerizable composition, and CR-39, respectively. The outermost coating layer of each of the resulting coated sheet-like photochromic elements was 5 to 8 μm thick.

A high quality lens was obtained in each combination of the (meth)acrylate-based polymerizable composition and one of the respective polymerizable lens compositions. Each of the lenses of Examples 25 through 27 had favorable optical characteristics as shown in Table 7-1 below.

Examples 28 through 30

A (meth)acrylate-based polymerizable composition (9) (urethane acrylate-based composition 3) was prepared composed of 48 parts by weight of a PO-modified neopentyl glycol diacrylate (Product name, PHOTOMER 4127-SN, manufactured by San Nopco Ltd.), 49 parts by weight of a trifunctional urethane acrylate oligomer (Product name, EBECRYL 264, manufactured by DAICEL-UCB Co., Ltd.), and 3 parts by weight of benzophenone (a polymerization initiator manufactured by Wako Pure Chemical Industries, Ltd.).

REVERSACOL MIDNIGHT GREY (manufactured by James Robinson Ltd.) was used as the photochromic compound.

The rest of the processes of Examples 28 through 30 was carried out in exactly the same manner as in Examples 22 through 24, respectively: cast polymerization in Examples 28 through 30 was performed by using the thiourethane-based polymerizable composition, episulfide-based polymerizable composition, and CR-39, respectively. The outermost coating layer of each of the resulting coated sheet-like photochromic elements was 5 to 8 μm thick.

A high quality lens was obtained in each combination of the (meth)acrylate-based polymerizable composition and one of the respective polymerizable lens compositions. Each of the lenses of Examples 28 through 30 had favorable optical characteristics as shown in Table 7-1 below.

Examples 31 through 33

The processes of Examples 31 through 33 were carried out in exactly the same manner as in Examples 22 through 24, respectively, except that a urethane acrylate-based coating UT-001 (10) (manufactured by Nippon Bee Chemical Co., Ltd.) (urethane acrylate-based composition 4) was used as the (meth)acrylate-based composition and REVERSACOL MIDNIGHT GREY (manufactured by James Robinson Ltd.) was used as the photochromic compound. The outermost coating layer of each of the resulting coated sheet-like photochromic elements was 7 to 9 μm thick.

A high quality lens was obtained in each combination of the (meth)acrylate-based polymerizable composition and one of the respective polymerizable lens compositions. Each of the lenses of Examples 31 through 33 had favorable optical characteristics as shown in Table 7-1 below.

Examples 34 through 36

A (meth)acrylate-based polymerizable composition (11) (polyester acrylate-based composition) was prepared composed of 45 parts by weight of a PO-modified neopentyl glycol diacrylate (Product name, PHOTOMER 4127-SN, manufactured by San Nopco Ltd.), 30 parts by weight of a tetrafunctional polyester acrylate oligomer (Product name, EBECRYL 80, manufactured by DAICEL-UCB Co., Ltd.), 20 parts by weight of a trifunctional urethane acrylate oligomer (Product name, EBECRYL 264, manufactured by DAICEL-UCB Co., Ltd.), and 5 parts by weight of benzophenone (a polymerization initiator manufactured by Wako Pure Chemical Industries, Ltd.).

As the photochromic compound, 6'-(2,3-dihydro-1H-indole-1-yl)-1,3-dihydro-3,3-dimethyl-1-propyl-spiro(2H-indole-2,3'-[3H]-naphtho-(2,1-b)-(1,4)-oxazine) (Product name, Reversacol Storm Purple, manufactured by James Robinson Ltd.) was used.

The rest of the processes of Examples 34 through 36 was carried out in exactly the same manner as in Examples 22 through 24, respectively. The outermost coating layer of each of the resulting coated sheet-like photochromic elements was 7 to 9 μm thick.

A high quality lens was obtained in each combination of the (meth)acrylate-based polymerizable composition and one of the respective polymerizable lens compositions. Each of the lenses of Examples 34 through 36 had favorable optical characteristics as shown in Table 7-1 below.

Examples 37 and 38

A (meth)acrylate-based polymerizable composition (12) (epoxy acrylate-based composition) was prepared by using 70 parts by weight of 1,9-nonanediol dimethacrylate (Product name, NK ester NOD-N, manufactured by Shin-Nakamura Chemical Co., Ltd.), 30 parts by weight of bisphenol A-type epoxy acrylate (Product name, NK oligomer EA-1020, manufactured by Shin-Nakamura Chemical Co., Ltd.), and 3 parts by weight of 2-hydroxy-2-methyl-1-phenyl-propane-1-one (Product name, DAROCUR 1173, a polymerization initiator manufactured by Ciba Specialty Chemicals).

As the photochromic compound, 6'-(2,3-dihydro-1H-indole-1-yl)-1,3-dihydro-3,3-dimethyl-1-propyl-spiro(2H-indole-2,3'-[3H]-naphtho-(2,1-b)-(1,4)-oxazine) (Product name, Reversacol Storm Purple, manufactured by James Robinson Ltd.) was used.

The rest of the processes of Examples 37 and 38 was carried out in exactly the same manner as in Examples 22 to 24, respectively. The outermost coating layer of each of the resulting coated sheet-like photochromic elements was 7 to 10 μm thick.

A high quality lens was obtained in each combination of the (meth)acrylate-based polymerizable composition and one of the respective polymerizable lens compositions. Each of the lenses of Examples 42 and 43 had favorable optical characteristics as shown in Table 7-2 below.

Example 39

A thiourethane resin-based lens was made in the same manner as described in (k-2-1) of Example 22, except that OKP 4 film (13), a fluorene-based polyester resin film (obtained by pressing the resin at 280° C. into an approx. 200 μm sheet, Osaka Gas Chemicals Co., Ltd.), was used as the transparent sheet. The resulting lens exhibited favorable photochromic properties as shown in Table 7-2.

Example 40

An episulfide resin-based lens was made in the same manner as in (k-2-2) of Example 23, except that an 80 μm thick TAC film (14) (manufactured by Konica Minolta Co., Ltd.) was used as the transparent sheet and the bending was performed at a temperature of 95° C. The resulting lens exhibited favorable photochromic properties as shown in Table 7-2.

Example 41

A thiourethane resin-based lens was made in the same manner as described in (k-2-1) of Example 22, except that a 200 μm APEL film (15) (Product name, APL 6509T, manufactured by Mitsui Chemicals Co., Ltd.) was used as the transparent sheet. The resulting lens exhibited favorable photochromic properties as shown in Table 7-2.

Comparative Example 5

A photochromic laminate was made in the same manner as in Example 22.

Without surface-treatment, the laminate was bent in the same manner as described in (k-1) of Example 22. An attempt was then made to form an episulfide resin-based lens in the same manner as described in (k-2-2) of Example 22.

The resultant lens was opaque due to the damaged surface of the laminate, however.

Comparative Example 6

The same process as in Example 36 was carried out without surface-treatment of TAC. An attempt was made to form an episulfide resin-based lens in the same manner as described in (k-2-2) of Example 22.

The polymerizable resin to serve as the lens substrate did not adhere to the TAC film, however.

Comparative Example 7

The same process as in Example 37 was carried out without surface-treatment of APEL. An attempt was made to form an episulfide resin-based lens in the same manner as described in (k-2-1) of Example 22.

The polymerizable resin to serve as the lens substrate did not adhere to APEL, however.

Comparative Example 8

The same process as in Example 35 was carried out without surface-treatment of OKP 4.

The resultant lens was opaque due to the damaged surface of the laminate, however.

TABLE 7

Appearance and Response to light as to Photochromic Laminates and Photochromic Plastic Lenses

| | | Photochromic Laminate | | | | Lens | | | | | |
|---|---|---|---|---|---|---|---|---|---|---|---|
| | Photochromic Agent | Transparent Sheet | Composition of Coating | Appearance | Polymerizable Lens Composition | Appearance | Transmittance(%) T1, Faded | Transmittance(%) T2, Darkened | Contrast (T1 − T2) | Transmittance(%) Darkened | Transmittance(%) Faded |
| Example 22 | Reversacol Flame | PC | Urethane acrylate-based 1 | ○ (transparent) | Thiourethane-based | ○ (transparent) | 87.8 | 42.4 | 45.4 | 7 | 89 |
| Example 23 | Reversacol Flame | PC | Urethane acrylate-based 1 | ○ | Episulfide-based | ○ | 87.6 | 42 | 45.6 | 8 | 88 |
| Example 24 | Reversacol Flame | PC | Urethane acrylate-based 1 | ○ | Allyl Carbonate-based | ○ | 86.9 | 41.6 | 44.8 | 7 | 88 |
| Example 25 | Reversacol Flame | PC | Urethane acrylate-based 2 | ○ | Thiourethane-based | ○ | 86.9 | 41.8 | 45.1 | 7 | 87 |
| Example 26 | Reversacol Flame | PC | Urethane acrylate-based 2 | ○ | Episulfide-based | ○ | 87.4 | 42.2 | 45.2 | 8 | 89 |
| Example 27 | Reversacol Flame | PC | Urethane acrylate-based 2 | ○ | Allyl Carbonate-based | ○ | 87.2 | 42.3 | 44.9 | 8 | 88 |
| Example 28 | Reversacol Midnight G | PC | Urethane acrylate-based 3 | ○ | Thiourethane-based | ○ | 86.5 | 28.4 | 58.1 | 12 | 28 |
| Example 29 | Reversacol Midnight G | PC | Urethane acrylate-based 3 | ○ | Episulfide-based | ○ | 87 | 29.1 | 57.9 | 11 | 29 |
| Example 30 | Reversacol Midnight G | PC | Urethane acrylate-based 3 | ○ | Allyl Carbonate-based | ○ | 86.6 | 28.9 | 57.7 | 12 | 29 |
| Example 31 | Reversacol Midnight G | PC | Urethane acrylate-based 4 | ○ | Thiourethane-based | ○ | 86.5 | 28.8 | 57.7 | 13 | 28 |
| Example 32 | Reversacol Midnight G | PC | Urethane acrylate-based 4 | ○ | Episulfide-based | ○ | 86.7 | 29.1 | 57.6 | 12 | 28 |
| Example 33 | Reversacol Midnight G | PC | Urethane acrylate-based 4 | ○ | Allyl Carbonate-based | ○ | 87.1 | 29 | 58.1 | 12 | 29 |
| Example 34 | Reversacol Storm Purple | PC | Polyester acrylate-based | ○ | Thiourethane-based | ○ | 83.3 | 41.2 | 42.1 | 4 | 17 |
| Example 35 | Reversacol Storm Purple | PC | Polyester acrylate-based | ○ | Episulfide-based | ○ | 83.2 | 41.3 | 41.9 | 3 | 18 |
| Example 36 | Reversacol Storm Purple | PC | Polyester acrylate-based | ○ | Allyl Carbonate-based | ○ | 83.4 | 41.6 | 41.8 | 4 | 18 |

| | | Laminate | | | | Lens | | | | | |
|---|---|---|---|---|---|---|---|---|---|---|---|
| | Photochromic Agent | Transparent Sheet | Composition of Coating | Appearance | Polymerizable Lens Composition | Appearance | Transmittance(%) T1, Faded | Transmittance(%) T2, Darkened | Contrast (T1 − T2) | Transmittance(%) Darkened | Transmittance(%) Faded |
| Example 37 | Reversacol Storm Purple | PC | Epoxy acrylate-based 1 | ○ | Thiourethane-based | ○ | 83.2 | 41.8 | 41.4 | 3 | 17 |
| Example 38 | Reversacol Storm Purple | PC | Epoxy acrylate-based 1 | ○ | Allyl Carbonate-based | ○ | 83.2 | 41.7 | 41.5 | 3 | 18 |
| Example 39 | Reversacol Flame | OKP4 | Urethane acrylate-based 1 | ○ | Thiourethane-based | ○ | 87.6 | 28.9 | 58.7 | 8 | 87 |
| Example 40 | Reversacol Flame | TAC | Urethane acrylate-based 1 | ○ | Episulfide-based | ○ | 87.3 | 28.7 | 58.6 | 8 | 88 |
| Example 41 | Reversacol Flame | APEL | Urethane acrylate-based 1 | ○ | Thiourethane-based | ○ | 86.9 | 28.8 | 58.1 | 7 | 88 |
| Comparative Example 5 | Reversacol Flame | PC | Non | ○ | Episulfide-based | Opaque | — | — | — | — | — |
| Comparative Example 6 | Reversacol Flame | TAC | Non | ○ | Episulfide-based | Non-adhesive | — | — | — | — | — |
| Comparative Example 7 | Reversacol Flame | APEL | Non | ○ | Thiourethane-based | Non-adhesive | — | — | — | — | — |
| Comparative Example 8 | Reversacol Flame | OKP4 | Non | ○ | Thiourethane-based | Opaque | — | — | — | — | — |

Performance of Plastic Polarizing/Photochromic Lenses of the Present Invention

Methods

The polarizing properties, including transmittance, degree of polarization, and coating thickness, as well as the photochromic properties, including appearance, transmittance, darkening time, and fading time, were determined for each of the plastic polarizing/photochromic lenses made in Examples and Comparative Examples given below. The measurements were made according to the same methods as used in the performance evaluation of the plastic polarizing lenses and plastic photochromic lenses.

Examples 42 through 44

(1) Production of a Polarizing Film Substrate (1) (to Serve as the Polarizing Sheet of the Present Invention)

As in Example 1, a polyvinyl alcohol sheet (Product name, KURARAY VINYLON #750, manufactured by Kuraray Co., Ltd.) was stained in an aqueous solution containing 0.25 g/L of Chlorantine Fast Red (C.I. 28160), 0.18 g/L of Chrysophenine (C.I. 24895), 1.0 g/L of Solophenyl Blue 4GL (C.I. 34200), and 10 g/L of sodium sulfate at 35° C. for 3 minutes. The stained sheet was then stretched to 4-folds its original length in the solution. Subsequently, the stained sheet was immersed in an aqueous solution containing 2.5 g/L of nickel acetate and 6.6 g/L of boric acid for 35° C. for 3 minutes. While strained, the film was dried at room temperature for 3 minutes and was then heated at 70° C. for 3 minutes to obtain a polarizing film substrate (1).

The resulting polarizing film showed the following optical characteristics: Transmittance obtained after luminosity correction in the entire visible range T (vis.)=19.3%, and Degree of Polarization P=99.8%. The film substrate contained 1.2 mg/g nickel and 1.3 mg/g boron. The obtained polarizing sheet has a thickness of 30 µm.

(m) Adhesive Composition (3)

As in Example 1, an adhesive composition (3) was prepared by using 25 parts by weight of diphenylmethane-4,4'-diisocyanate and 600 parts by weight of ethyl acetate as a solvent relative to 100 parts by weight of polypropylene glycol (M=900).

(n) Production of a Polymerizable Composition (16) Containing a Photochromic Compound (to Serve as the Material of the Photochromic Sheet of the Present Invention)

As in Example 22, 15 g of a polyurethane prepolymer, which was obtained by the reaction of diphenyl methane-4,4'-diisocyanate with a polypropylene glycol having an average degree of polymerization of 15 and which had an NCO equivalent weight of 1500 (equivalent weight is defined as the average molecular weight per one functional group), was dissolved in 13.58 g of organic solvents (4.636 g toluene, 1.745 g methyl ethyl ketone, and 7.2 g ethyl acetate). To this solution, 0.075 g of 4-[4-[6-(4-morpholinyl)-3-phenyl-3H-naphtho(2,1-b)pyran-3-yl]phenyl]-morpholine (Product name, Reversacol Flame, manufactured by James Robinson Ltd.) to serve as a photochromic compound, 0.453 g of bis(1,2,2,6,6-pentamethyl-4-piperidyl)sebacate as an additive, and 0.227 g of 3,9-bis[1,1-dimethyl-2-[β-(3-tert-butyl-4-hydroxy-5-methylphenyl)propionyloxy]ethyl]-2,4,8,10-tetraoxaspiro[5,5]undecane were added and the mixture was mixed until uniform. Subsequently, 1.6 g of a curing agent (Product name, BHS6020C, manufactured by Toyo morton Ltd.), which was obtained by the reaction of trilene diisocyanate with polypropylene glycol and had an OH equivalent weight of 630, was added to the solution and the mixture was further stirred.

(o) Transparent Sheet for Use in the Present Invention

A 300 µm thick polycarbonate sheet (2) (Product name, Iupilon, manufactured by Mitsubishi Gas Chemical Co., Ltd.) was used to as the transparent sheet.

(p) (Meth)Acrylate-Based Polymerizable Composition (4)

A (meth)acrylate-based polymerizable composition (4) was prepared by using 60 parts by weight of 1,9-nonanediol acrylate (Product name Biscoat #215, manufactured by Osaka Organic Chemical Industry Ltd.), 37 parts by weight of a polyfunctional urethane acrylate oligomer (Product name, U-4HA, manufactured by Shin-Nakamura Chemical Co., Ltd.), and 3 parts by weight of 2-hydroxy-2-methyl-1-phenyl-propane-1-one (Product name, DAROCUR 1173, manufactured by Ciba Specialty Chemicals).

(q) Production of Coated Polarizing/Photochromic Element

Using a #24 bar coater, the adhesive composition (3) was applied to one surface of the polarizing film substrate (1) obtained in (1) above and was dried at room temperature for 5 minutes. Using a laminator (manufactured by Mitsushiba Shoji Co., Ltd.), this surface was laminated with the polycarbonate sheet (2) obtained in (o) under a nip pressure of 4.0 kg/cm$^2$G to form a sheet. Meanwhile, the photochromic polymerizable composition (16) obtained in (n) above was applied to a separate polycarbonate sheet using a doctor blade with a 200 µm clearance (Yoshimitsu Seiki Co., Ltd.). The coated sheet was then placed in a hot air dryer at 60° C. for 10 minutes to evaporate the solvent. Using a laminator again, the polarizing sheet was then laminated onto the coating of the photochromic composition via the polarizing film substrate. Subsequently, the polymerizable composition was cured by heating at 70° C. for 2 days. This gave a polarizing/photochromic laminate consisting of two transparent sheets, a photochromic compound-containing thermosetting polyurethane resin layer (photochromic layer) interposed between the transparent sheets, and a polarizing sheet.

Using a #24 bar coater, the (meth)acrylate-based polymerizable composition (4) was applied to one surface of the resulting polarizing/photochromic laminate to serve as an outermost layer, which was then covered with a 50 µm polyethylene film (manufactured by Toray Synthetic Film Co., Ltd.). A UV-ray was then irradiated onto the polyethylene film at 2200 mJ/cm$^2$. The other surface of the laminate was treated in a similar manner.

The coating on each surface was determined to be 6 to 8 µm thick after curing.

When unexposed to light, the polarizing/photochromic laminate had a transmittance of 19.0% and a degree of polarization of 99.8%, which were comparable to those of the polarizing film substrate itself. Upon exposure to light, the polarizing/photochromic laminate quickly developed color: after a 7 minute irradiation period at 23° C., the transmittance was 9.8% and the degree of polarization was 99.9%. The laminate had a favorable appearance.

(r) Production of Plastic Photochromic/Polarizing Lens by Cast Polymerization (r-1) Bending of the Coated Photochromic/Polarizing Laminate A disk was stamped out of the laminate obtained in (q) above and was vacuum-molded at 140° C. in a 3 mmHg atmosphere for 5 minutes into a lens-shaped bent product with a curvature R of 87.2 mm.

(r-2) Cast Polymerization (r-2-1) Cast Polymerization Using Thiourethane-Based Polymerizable Composition (5) (Example 42)

The resulting bent product was trimmed to a diameter of 60 mm and was placed in a spherical glass mold, also 60 mm in diameter. A polymerizable lens composition (5), composed of 39.55 parts by weight of pentaerythritol tetrakis (3-mercaptopropionate), 30.45 parts by weight of m-xylylene diisocyanate, and 0.035 parts by weight of dibutyltin dilaurate, was injected into the spaces defined within the mold above and below the bent product. The mold was heated from 30° C. to 100° C. at a rate of 3.5° C./hour and, subsequently, from 100° C. to 120° C. at a rate of 20° C./hour and was maintained at 120° C. for 3 hours to allow the composition to polymerize.

This resulted in a lens that had a good transparency and in which the coated polarizing/photochromic laminate and the lens substrate are firmly integrated together. No significant color change was visually observed in the resulting lens as compared to the sheet prior to the polymerization. The spectrophotometry analysis also revealed that the photochromic properties and the degree of polarization of the laminate (i.e., appearance and transmittance) were well preserved in the lens as shown in Table 8.

(r-2-2) Cast Polymerization Using Episulfide-Based Polymerizable Composition (6) (Example 43)

As the polymerizable lens composition, an episulfide-based polymerizable composition (6) was prepared by mixing 95 parts by weight of bis(β-epithiopropyl)sulfide, 5 parts by weight of bis(2-mercaptoethyl)sulfide, and 0.05 parts by weight of tetra-n-butylphosphonium bromide.

Polymerization was carried out in exactly the same manner as in (r-2-1), except that the temperature was raised from 20° C. to 100° C. at a rate of 4° C./hour and subsequently from 100° C. to 120° C. at a rate of 20° C./hour and was then maintained at 120° C. for 3 hours.

Again, a high quality lens was obtained with favorable photochromic properties and degree of polarization as shown in Table 8.

(r-2-3) Cast Polymerization Using CR-39 (7) (Example 44)

As the polymerizable lens composition, CR-39 (7) was prepared by mixing 150 parts by weight of diethylene glycol bis(allyl carbonate) and 5 parts by weight of diisopropyl peroxycarbonate.

Polymerization was carried out in exactly the same manner as in (r-2-1), except that the temperature was initially maintained at 30° C. for 10 hours, was raised from 30° C. to 100° C. at a rate of 7° C./hour, and was subsequently maintained at 100° C. for 1 hour.

Also in this case, a high quality lens was obtained with favorable photochromic properties and degree of polarization as shown in Table 8.

TABLE 8

Evaluation of Optical Property of Polarizing or Photochromic Plastic Lenses

| Example | Photochromic Agent | Transparent Sheet | Composition of Coating | Appearance | Polymerizable Lens Composition | Transmittance(%) Darkened | Transmittance(%) Faded | Degree of Polarization(%) Darkened | Degree of Polarization(%) Faded |
|---|---|---|---|---|---|---|---|---|---|
| Example 42 | Reversacol Flame | PC | Urethane acrylate-based C | ○ | Thiourethane-based | 9.8 | 18.8 | 99.9 | 99.8 |
| Example 43 | Reversacol Flame | PC | Urethane acrylate-based C | ○ | Episulfide-based | 9.7 | 18.9 | 99.9 | 99.8 |
| Example 44 | Reversacol Flame | PC | Urethane acrylate-based C | ○ | CR-39 | 9.8 | 18.9 | 99.9 | 99.8 |

The invention claimed is:

1. A light control plastic lens having a sheet-like light control element including at least a light control sheet, the lens comprising the sheet-like light control element, a curable resin layer laminated on at least one surface of the sheet-like light control element, and a polymerizable lens resin layer laminated at least on the curable resin layer, wherein the polymerizable lens resin layer contains a sulfur-containing polymerizable compound.

2. The light control plastic lens according to claim 1, wherein the light control sheet serves either as a polarizing sheet or a photochromic sheet or both.

3. The light control plastic lens according to claim 1, wherein the curable resin layer is formed of a (meth)acrylate resin.

4. The light control plastic lens according to claim 3, wherein the (meth)acrylate resin is at least one selected from the group consisting of urethane(meth)acrylate resins, polyester(meth)acrylate resins, and epoxy(meth)acrylate resins.

5. The light control plastic lens according to claim 3, wherein the layer of the (meth)acrylate resin is from 2 μm to 13 μm thick.

6. The light control plastic lens according to claim 1, wherein the sheet-like light control element is a light control laminate.

7. The light control plastic lens according to claim 6, wherein the light control laminate comprises at least the light control sheet and a transparent sheet laminated on at least one surface of the light control sheet.

8. The light control plastic lens according to claim 2, wherein the polarizing sheet is formed of a polyvinyl alcohol-based resin, contains a dichromatic pigment, and is treated with a metal compound and boric acid.

9. The light control plastic lens according to claim 2, wherein the photochromic sheet is formed of a polyurethane-based resin, and contains a photochromic pigment.

10. The light control plastic lens according to claim 9, wherein the photochromic pigment is at least one selected from the group consisting of spirobenzopyran derivatives, naphthopyran derivatives, and spirooxazine derivatives.

11. The light control plastic lens according to claim 7, wherein the transparent sheet is formed of at least one selected from the group consisting of polycarbonate resins, cellulose resins, alicyclic polyolefin resins and polyester resins.

12. The light control plastic lens according to claim 7, wherein the transparent sheet is formed of a polycarbonate resin.

13. The light control plastic lens according to claim 7, wherein the transparent sheet is 20 μm to 2 mm thick.

14. The light control plastic lens according to claim 1, wherein the sulfur-containing polymerizable compound is at least one selected from the group consisting of thiourethane-based polymerizable compounds and episulfide-based polymerizable compounds.

* * * * *

UNITED STATES PATENT AND TRADEMARK OFFICE
CERTIFICATE OF CORRECTION

| | |
|---|---|
| PATENT NO. | : 7,350,917 B2 |
| APPLICATION NO. | : 11/041337 |
| DATED | : April 1, 2008 |
| INVENTOR(S) | : Ryozo Kawai et al. |

It is certified that error appears in the above-identified patent and that said Letters Patent is hereby corrected as shown below:

Title Page
Please add the following Assignees (73):

MGC Filseet Co., Ltd.
MITSUBISHI GAS CHEMICAL COMPANY, INC.

Signed and Sealed this

Thirteenth Day of January, 2009

JON W. DUDAS
*Director of the United States Patent and Trademark Office*